(12) United States Patent
Suzuki et al.

(10) Patent No.: US 7,705,919 B2
(45) Date of Patent: Apr. 27, 2010

(54) VIDEO PROCESSING DEVICE, VIDEO DISPLAY DEVICE AND VIDEO PROCESSING METHOD THEREFOR AND PROGRAM THEREOF

(75) Inventors: Tetsuaki Suzuki, Tokyo (JP); Akira Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 801 days.

(21) Appl. No.: 10/083,362

(22) Filed: Feb. 27, 2002

(65) Prior Publication Data

US 2002/0145678 A1    Oct. 10, 2002

(30) Foreign Application Priority Data

Feb. 28, 2001    (JP)    ............... 2001-053449

(51) Int. Cl.
- *H04N 9/64* (2006.01)
- *H04N 9/73* (2006.01)
- *H04N 5/202* (2006.01)
- *G06K 9/00* (2006.01)
- *G06K 9/34* (2006.01)
- *G06K 9/40* (2006.01)

(52) U.S. Cl. ............ 348/672; 348/655; 348/674; 348/678; 348/700; 348/703; 382/164; 382/167; 382/168; 382/274

(58) Field of Classification Search ......... 348/671–675, 348/678, 607, 687, 655–657, 700, 703; 382/164, 382/167, 168–172, 274; *H04N 9/69, 5/64*
See application file for complete search history.

(56) References Cited

U.S. PATENT DOCUMENTS 3,634,613 A * 1/1972 Abel ................... 348/678

4,679,067 A * 7/1987 Belmares-Sarabia et al. ................... 348/655
4,823,184 A * 4/1989 Belmares-Sarabia et al. ................... 348/650

(Continued)

FOREIGN PATENT DOCUMENTS

JP    9-147098    6/1997

(Continued)

OTHER PUBLICATIONS

A. Inoue et al., "Adaptive Quality Improvement Method for Color Images", The 24$^{th}$ Image Technology Conference Proceedings 3-3, (1993), pp. 95-98.

(Continued)

*Primary Examiner*—Brian P Yenke
(74) *Attorney, Agent, or Firm*—Sughrue Mion, PLLC

(57) ABSTRACT

In the video processing device, a correction amount update determining unit determines whether to update a correction amount based on an input image obtained from an image input unit and when a cut point is detected or when the number of frames in a number of frames storing unit exceeds a fixed value, determines that update is required, and at this time, a correction amount obtaining unit obtains a new correction amount based on the input image. Then, if no cut point is detected, an amount of change of a correction amount in time is limited and the obtained result is recorded in a correction amount storing unit, and an image correcting unit conducts quality improving correction processing with respect to the input image based on a correction amount recorded in the correction amount storing unit and the image corrected is sent to an image output unit.

8 Claims, 34 Drawing Sheets

U.S. PATENT DOCUMENTS

| | | | | | |
|---|---|---|---|---|---|
| 5,247,366 | A | * | 9/1993 | Ginosar et al. | 348/256 |
| 5,289,282 | A | * | 2/1994 | Tsuji et al. | 348/624 |
| 5,296,910 | A | * | 3/1994 | Cole | 356/28.5 |
| 5,642,294 | A | * | 6/1997 | Taniguchi et al. | 348/700 |
| 5,691,821 | A | * | 11/1997 | Hieda et al. | 348/217.1 |
| 5,719,643 | A | * | 2/1998 | Nakajima | 348/700 |
| 5,949,496 | A | * | 9/1999 | Kim | 348/645 |
| 5,949,918 | A | * | 9/1999 | McCaffrey | 382/274 |
| 5,966,121 | A | * | 10/1999 | Hubbell et al. | 715/726 |
| 6,026,179 | A | * | 2/2000 | Brett | 382/162 |
| 6,097,836 | A | * | 8/2000 | Inoue | 382/165 |
| 6,163,321 | A | * | 12/2000 | Kiyokawa | 345/589 |
| 6,229,577 | B1 | * | 5/2001 | Barth et al. | 348/602 |
| 6,351,558 | B1 | * | 2/2002 | Kuwata | 382/168 |
| 6,456,328 | B1 | * | 9/2002 | Okada | 348/699 |
| 6,496,228 | B1 | * | 12/2002 | McGee et al. | 348/700 |
| 6,654,028 | B1 | * | 11/2003 | Yamakawa | 345/690 |
| 6,671,000 | B1 | * | 12/2003 | Cloutier | 348/675 |
| 6,674,898 | B2 | * | 1/2004 | Herman | 382/167 |
| 6,724,933 | B1 | * | 4/2004 | Lin et al. | 382/164 |
| 6,735,776 | B1 | * | 5/2004 | Legate | 725/25 |
| 6,792,043 | B1 | * | 9/2004 | Takahashi et al. | 375/240.01 |
| 6,816,613 | B2 | * | 11/2004 | Tohyama et al. | 382/167 |
| 6,873,658 | B2 | * | 3/2005 | Zhou | 375/240.25 |
| 7,013,042 | B1 | * | 3/2006 | Yamada et al. | 382/167 |
| 7,046,731 | B2 | * | 5/2006 | Wu et al. | 375/240.16 |
| 7,068,328 | B1 | * | 6/2006 | Mino | 348/672 |
| 2001/0003468 | A1 | * | 6/2001 | Hampapur et al. | 348/700 |
| 2001/0012399 | A1 | * | 8/2001 | Tohyama et al. | 382/167 |
| 2001/0048486 | A1 | * | 12/2001 | Akama et al. | 348/700 |
| 2002/0118883 | A1 | * | 8/2002 | Bhatt | 382/224 |
| 2002/0126758 | A1 | * | 9/2002 | Blanchard | 375/240.13 |
| 2003/0016881 | A1 | * | 1/2003 | Matsuura | 382/274 |
| 2003/0152283 | A1 | * | 8/2003 | Moriwaki | 382/274 |

FOREIGN PATENT DOCUMENTS

JP  10-150566  6/1998

OTHER PUBLICATIONS

M. Tsukada et al., "Automatic Color Correction Method for Preferred Color Reproduction", Color Forum Japan 2000 Proceedings, (2000), pp. 9-12.

* cited by examiner

FIG. 28 (PRIOR ART)
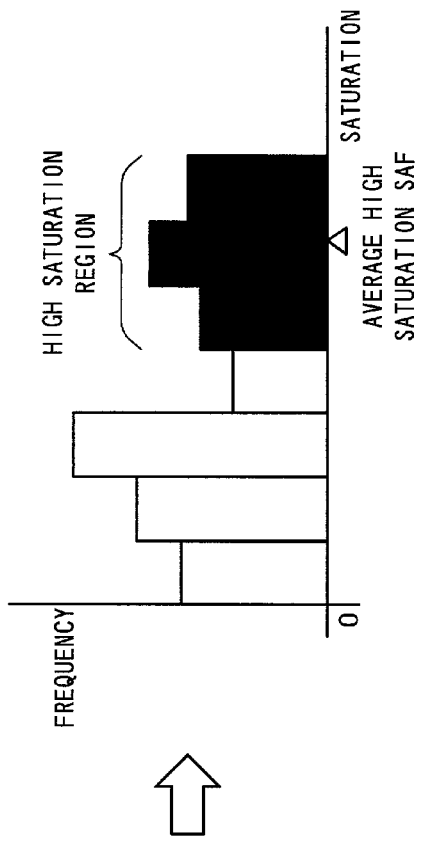
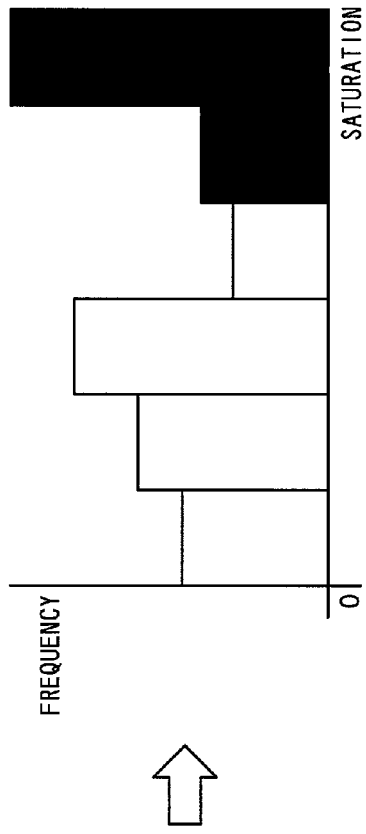
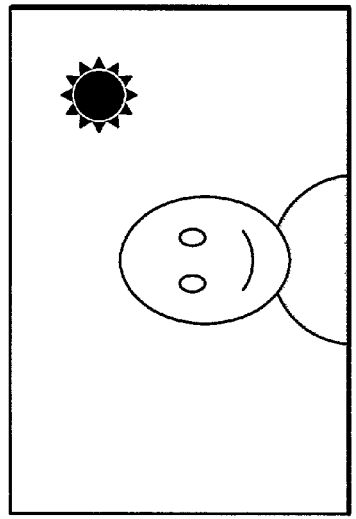
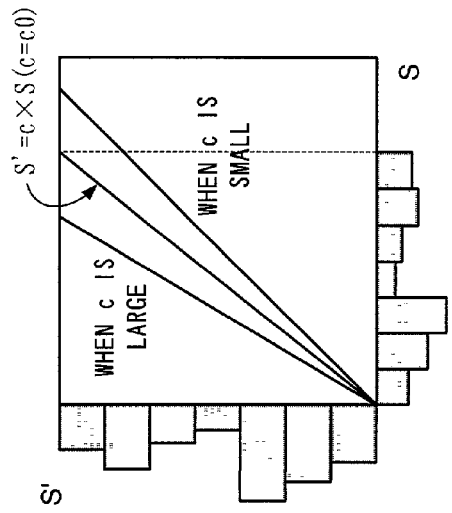

FIG. 29 (PRIOR ART)
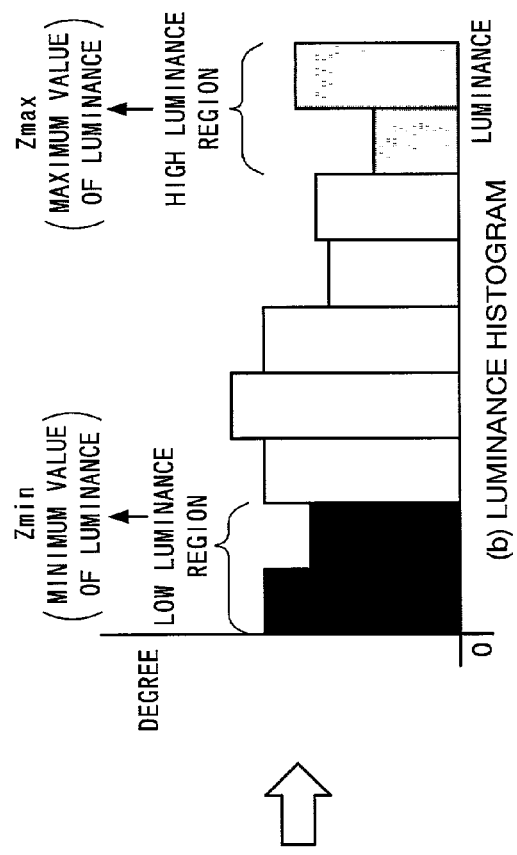
(a) FRAME IMAGE
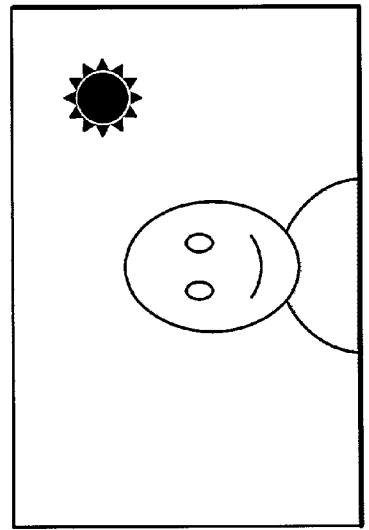
(c) EXPOSURE CORRECTION
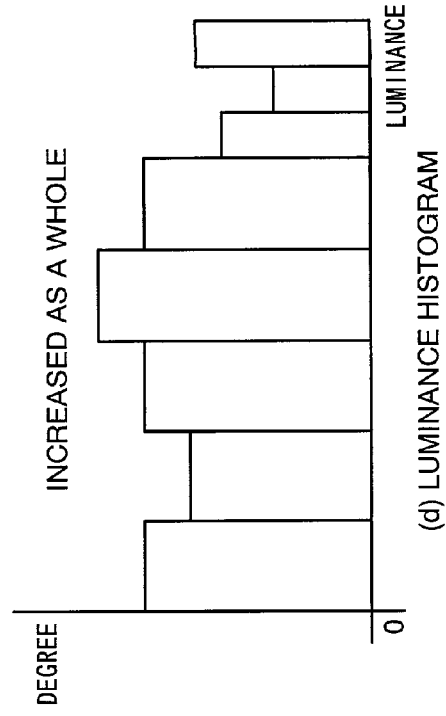
(b) LUMINANCE HISTOGRAM
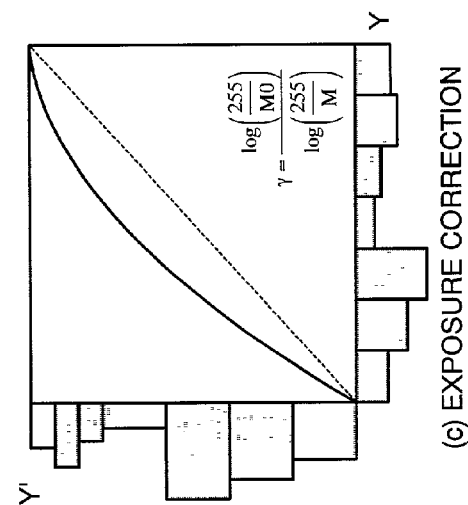
(d) LUMINANCE HISTOGRAM

FIG.31 (PRIOR ART)
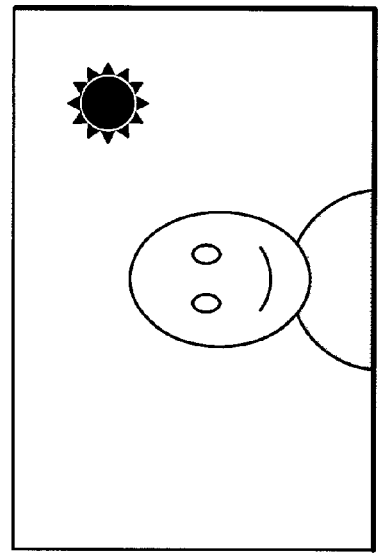
(a) FRAME IMAGE
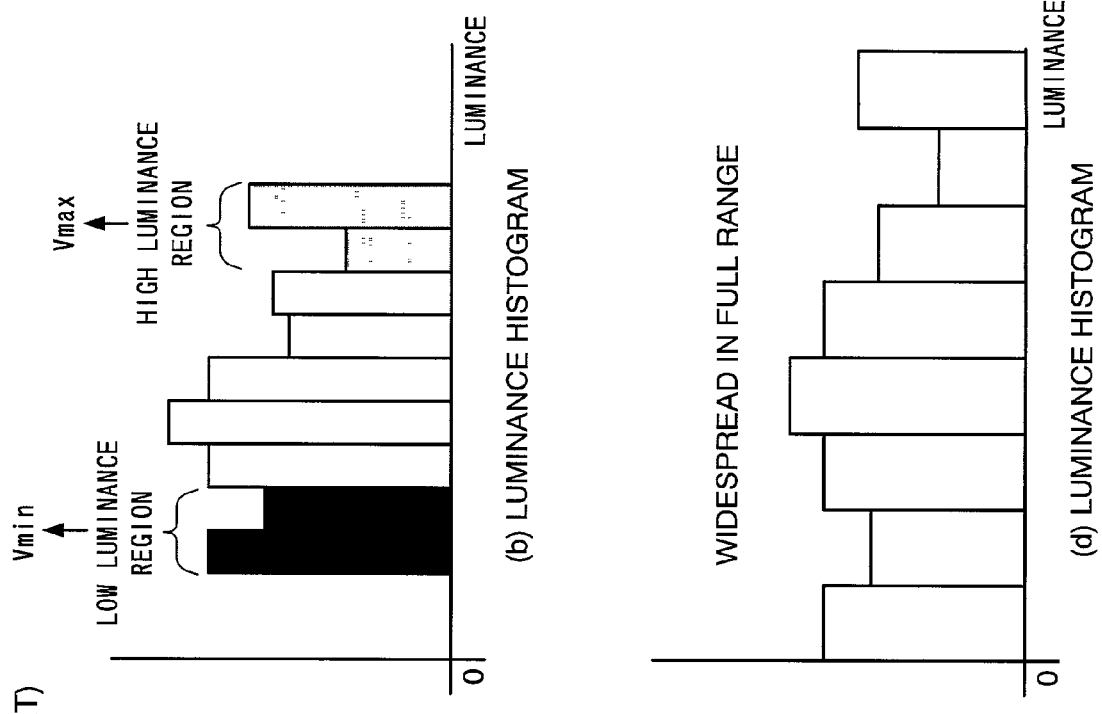
(b) LUMINANCE HISTOGRAM
(d) LUMINANCE HISTOGRAM
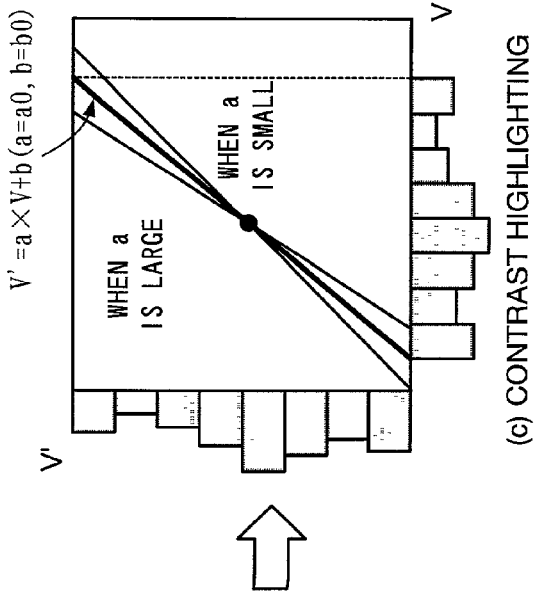
(c) CONTRAST HIGHLIGHTING FIG. 32 (PRIOR ART)
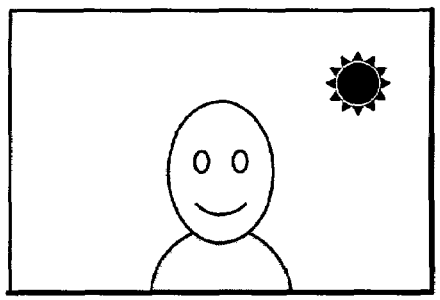 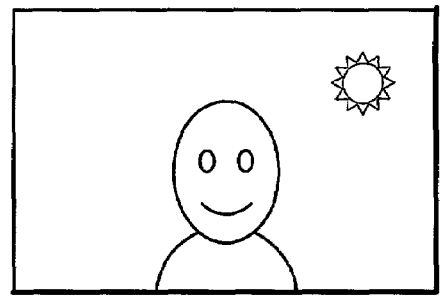
(a) FRAME IMAGE  (b) EDGE IMAGE

FIG. 33 (PRIOR ART)
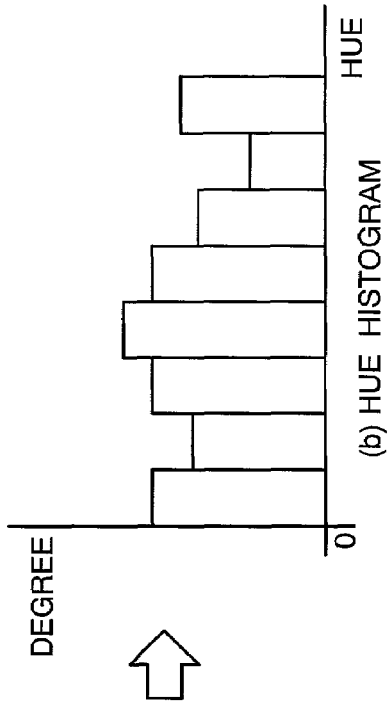
(a) FRAME IMAGE
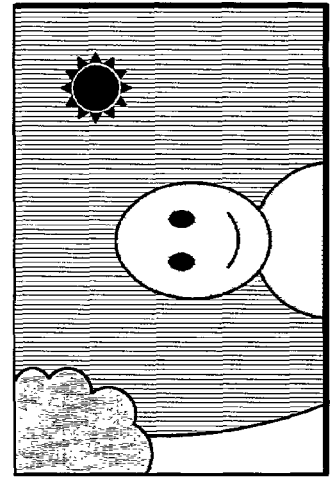
(b) HUE HISTOGRAM
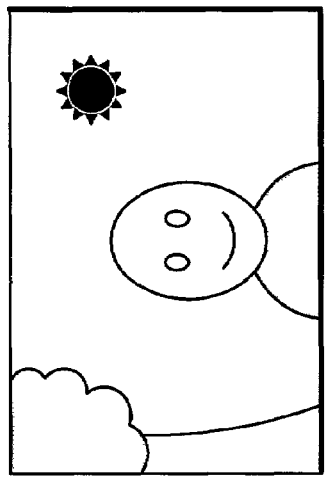
(c) COLOR CORRECTION PARAMETER FOR DIVISIONAL HUE REGION
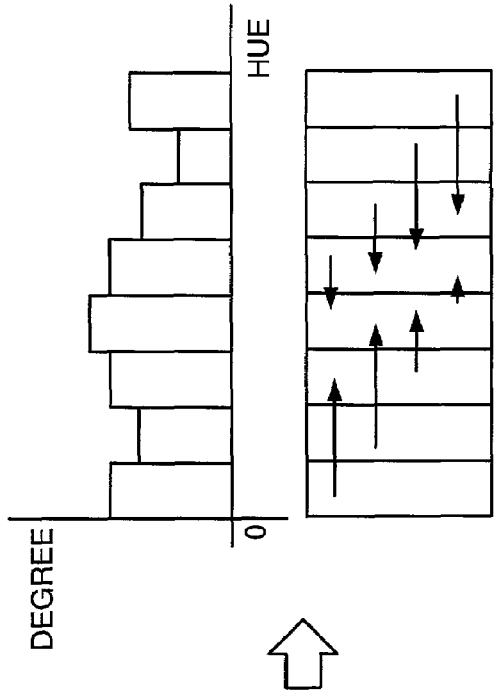
(d) IMAGE BEING CORRECTED
SKIN COLOR, SKY COLOR AND GREEN OF PLANTS BECOME MORE PREFERABLE

VIDEO PROCESSING DEVICE, VIDEO DISPLAY DEVICE AND VIDEO PROCESSING METHOD THEREFOR AND PROGRAM THEREOF

BACKGROUND OF THE INVENTION

1. Field of the Invention

The present invention relates to a video processing device, a video display device and a video processing method therefor, and a program thereof and, more particularly, to a method of automatically improving quality of a moving image.

2. Description of the Related Art

Image quality improving represents subjecting an original image to image correction processing so as to make still picture and moving picture clearer. Among correction processing for improving image quality are saturation correction and γ (gamma) correction.

Saturation correction is correction intended to adjust saturation indicative of a density of color. Since people are apt to prefer an image whose saturation is high, saturation correction is often conducted so as to adjust saturation of an original image to be high. γ correction is correction intended to adjust brightness of an image. People prefer images of appropriate brightness to images too dark or too bright. Adjusting such brightness is γ correction.

Other than those mentioned above, various kinds of corrections exist and using these correction processing methods to make an image clearer is represented as image quality improving processing. As the above-described image quality improving methods, there conventionally exist such methods as set forth below.

For improving quality of a still image, various still picture quality automatic improving techniques have been used. Still picture quality improving techniques here include those recited in "Color Image Quality Automatic Improvement by Adjustment of Saturation, Contrast, and Sharpness" (Inoue and Tajima, the 24th Image Technology Conference Proceedings 3-3, 1993)(Literature 1), Japanese Patent Laying-Open (Kokai) No. Heisei 09-147098 (Literature 2), Japanese Patent Laying-Open (Kokai) No. Heisei 10-150566 (Literature 3) and "Automatic Color Correction Method Realizing Preferable Color Reproduction" (Tsukada, Funayama, Tajima, Color Forum JAPAN 2000 Proceedings, pp. 9-12, 2000) (Literature 4).

In the automatic image quality improving methods recited in these literatures, a certain feature amount is extracted from an input image composed of still images and a correction amount is determined based on the feature amount to conduct correction for quality improving. Feature amount here represents, for example, an average luminance of a dark region within a screen or an average tone value of each of RGB (R: red, G: green, B: blue) in a bright region within a screen.

In the following, one example of each correction method will be detailed. One example of saturation correction realization methods is shown in FIG. 28. In the present saturation correction realization method, first create a histogram of S values using an HSV (Hue Saturation Value) coordinate system or the like with respect to an input image illustrated in FIG. 28(a) [see FIG. 28(b)]. The HSV coordinate system here is recited in "Color Gamut Transformation Pairs" (A. R. Smith, Computer Graphics, vol. 12, pp. 12-19, 1978).

An S value in the HSV coordinate system denotes saturation, and a histogram of S values therefore can be considered as a histogram of saturation. In the histogram here generated, assume that a high saturation portion where an area ratio to the total number of pixels has a fixed rate "a" is a high saturation region. Then, calculate an average saturation SAF of the high saturation region [see FIG. 28(b)]. Calculate a correction amount Copt from the average saturation SAF according to the following expression:

$$Copt = SAFopt/SAF \qquad (1)$$

where the average saturation SAFopt represents an optimum value that a saturation image of an input image can take.

The larger thus calculated correction amount Copt becomes, the more saturation will be highlighted [see FIG. 28(c)]. The value of c0 in the figure is that obtained when a range of the saturation S of an input image is expanded to the largest and when c=c0, the saturation S of the input image extends to the largest range as shown in FIG. 28(c) [see FIG. 28(d)].

In image quality improving, obtain an S value from an RGB value of each pixel of a frame image and linearly transform the obtained value according to the following expression:

$$S' = C0pt \times S \qquad (2).$$

After the transformation, restoring the value to an RGB value again leads to completion of an image being corrected. The above-described saturation correction is recited in Literature 1.

One example of exposure correction realization methods is shown in FIG. 29. In the present exposure correction realization method, first create a histogram of Y values using an XYZ coordinate system with respect to an input image illustrated in FIG. 29(a) [see FIG. 29(b)]. Since a Y value denotes luminance, the histogram of Y values can be considered as a luminance histogram.

At this time, with all times the number of pixels set to be m, and with a value of the m-th highest luminance as Zmax and a value of the m-th lowest luminance as Zmin, obtain an intermediate value M of the histogram according to the following expression:

$$M = (Zmax + Zmin)/2 \qquad (3).$$

A γ value with which the intermediate value M becomes M0, half the dynamic range, after the transformation can be obtained by the following expression:

$$\gamma = [\log(255/M0)]/[\log(255/M)] \qquad (4).$$

Exposure correction is realized by first obtaining a Y value from an RGB value of each pixel of a frame image and subjecting the input image to gamma correction by using a γ value obtained by the expression (4) and the following expression with respect to the obtained Y value [see FIGS. 29(c) and (d)].

$$Y = \frac{255}{255^\gamma} Y^\gamma \qquad (5)$$

As to the above-described exposure correction, recitation is found in Literature 3.

One example of white balance correction realization methods is shown in FIG. 30. In the present white balance correction method, first create a luminance histogram with respect to an input image illustrated in FIG. 30(a) using an XYZ coordinate system or the like [see FIG. 30(b)].

At this time, with "a" times the number of pixels set to be m, consider a mean value of the respective tone values of pixels having the highest to the m-th highest luminances as a white point of the image. With the white point RGB value denoted as (wr, wg, wb) and a white color RGB value obtained after adjustment as (wr0, Wg0, wb0), obtain white balance correction amounts r, g, b according to the following expressions:

$$r = wr0/wr$$

$$g = wg0/wg$$

$$b = wb0/wb \quad (6).$$

Based on the above obtained correction amounts and the following expressions, linear transformation of each tone value will realize white balance correction as illustrated in FIG. 30(c):

$$R' = r \times R$$

$$G' = g \times G$$

$$B' = b \times B \quad (7).$$

As to the above-described white balance correction, recitation is found in Literature 2.

One example of contrast correction realization methods is shown in FIG. 31. In the contrast correction realization method, first, create a histogram of Y values, that is, a luminance histogram, with respect to an input image illustrated in FIG. 31(a) using an XYZ coordinate system or the like [see FIG. 31(b)].

At this time, with "a" times the number of pixels set to be m, obtain an average luminance Vmax of pixels having the highest to the m-th highest luminances. Similarly, obtain an average luminance Vmin of pixels having the lowest to the m-th lowest luminances [see FIG. 31(b)].

Based on these values, obtain the following expression which is a straight line passing the coordinates (Vmin, 0), (Vmax, 255):

$$V' = a \times V + b \quad (8).$$

In the expression, V denotes a luminance Y value of a pixel of an original image and V' denotes a Y value of the pixel transformed. By linearly transforming a luminance of each pixel using the expression (8) for the inversion into an RGB value realizes contrast highlighting. As to the above-described contrast correction, recitation is found in Literature 1.

One example of sharpness correction realization methods is shown in FIG. 32. In the present sharpness correction method, first subject an input image shown in FIG. 32(a) to a high-pass filter to extract an edge component as illustrated in FIG. 32(b). With ss representing a high-pass filter, E(V) representing an edge region, AE(V) representing an area of an edge region, V representing a luminance and ES0pt representing an optimum sharpness of the image in question, the sharpness correction amount k will be obtained by the following expression:

$$k = \frac{ES_{opi} \cdot A_E(V') - \int\int_{E(V')} |V \otimes ss| dx dy}{\int\int_{E(V')} |V \otimes ss \otimes ss| dx dy} \quad (9)$$

Using k obtained by the expression (9), the sharpening will be conduced based on the following expression:

$$V' = V + k(V \otimes ss) \quad (10)$$

By inversely transforming an RGB value from V' obtained by the expression (10), sharpness correction will be realized. As to the above-described sharpness correction, recitation is found in Literature 1.

One example of preferable color correction realization methods is shown in FIG. 33. Preferable color correction is making look of color of an image (representing how the color is perceived by a person, which is also the case in the following description) be more preferable to human eyes by approximating the color of the image to color of the object remembered by a person. Specific processing shown in FIG. 33 as an example is conducted in a manner as follows.

Calculate a hue of each pixel of a frame image shown in FIG. 33(a) to create such a histogram of hues as illustrated in FIG. 33(b). Correct the histogram to make hues related to skin color, color of the sky and green color of plants be those producing more preferable colors by adapting color correction parameters given in advance according to each divisional hue region as shown in FIG. 33(c).

As a result, as illustrated in FIG. 33(d), the image has more preferable colors with only the colors of skin, the sky and green of plants changed. Subjecting the image to such processing realizes preferable color correction. The preferable color correction is intended for obtaining color that one finds preferable when looking only at a corrected image and is conducted based on the contents of know-how accumulated in a data base for a long period of time. As to the above-described preferable color correction, recitation is found in Literature 4.

Using such still picture automatic quality improving techniques as mentioned above realizes quality improving of still picture. Used for improving quality of a moving image is a method of improving quality using a fixed parameter. Fixed parameter is a correction amount parameter fixed to a constant value in order to conduct certain correction for a moving image. Fixed parameters are, for example, as follows.

As shown in FIG. 34, generate images corrected with γ values as various gamma correction parameters in the expression (5) changed and compare the images to obtain an optimum γ value with which the image looks clearer by a subjective evaluation test. At the time of subjecting a moving image to γ correction, when the correction is conducted using an optimum γ value without changing a γ value, the γ value can be considered as a fixed parameter. Technique for improving quality of images using such fixed parameter not only in γ correction but also in various correction processing is employed in moving image quality improving processing.

With the above-described conventional systems in which a correction amount is given by a fixed parameter, however, the moving image quality improving techniques fail to appropriately change a correction amount according to a video source and video shooting conditions.

Moving image has its image quality largely varying depending on its video source and video shooting conditions. In terms of the difference in video sources, a moving image obtained from a DVD (Digital Versatile Disc) deck has high saturation and relatively high contrast, while a moving image shot by an individual person using a home-use digital video camera or the like has low saturation and low contrast as well because of properties of cameras.

In terms of shooting conditions, scenery shot by a digital video camera in cloudy weather and that shot in fine weather will partially differ in saturation and contrast. Quality of a moving image thus varies largely depending on circumstances.

On the other hand, with a correction amount determined by a fixed parameter, while an image taken by a digital video camera is clear, a DVD image might exhibit unnatural look because of too much correction in some cases. Although such a case can be coped with by a method of obtaining a fixed parameter for each video source and manually switching and using the parameters according to each video source, the method is not convenient because it fails to cope with different image qualities caused by different shooting conditions and needs manual switching.

SUMMARY OF THE INVENTION

Under these circumstances, an object of the present invention is to eliminate the above-described shortcomings and provide a video processing device, a video display device and a video processing method therefor and a program thereof which enable a correction amount to be appropriately changed according to image quality of an input moving image and enable quality of a moving image to be automatically improved.

According to the first aspect of the invention, a video processing device comprises correction amount obtaining means for obtaining a correction amount from sequentially applied moving images, and image correcting means for subjecting an input moving image to quality improving correction processing based on a correction amount obtained by the correction amount obtaining means.

In the preferred construction, the video processing device further comprises image input means for obtaining a frame image from sequentially applied moving images and outputting the image to the correction amount obtaining means, wherein the correction amount obtaining means obtains the correction amount from the frame image and the image correcting means subjects the frame image to quality improving correction processing based on the correction amount.

In another preferred construction, the video processing device further comprises correction region cutting-out means for, before the moving image is subjected to correction processing, cutting out a region to be corrected from the moving image in question, and image composing means for combining a region to be corrected which is cut out by the correction region cutting-out means and a region not to be corrected which is a remainder left after the region to be corrected in question is cut out.

In another preferred construction, the video processing device further comprises correction amount change limiting means for limiting an amount of change between a correction amount of a current frame image obtained by the correction amount obtaining means and a stored correction amount of a preceding frame image.

In another preferred construction, the video processing device further comprises lapse of fixed time detecting means for counting the number of frames from a frame image whose the correction amount is lastly updated to a current frame image to determine whether the number of frames exceeds a fixed value, and correction amount update determining means for giving an instruction to update the correction amount when the lapse of fixed time detecting means determines that a fixed time has elapsed.

In another preferred construction, the video processing device further comprises cut point detecting means for detecting a cut point indicative of switching of a scene in the moving image based on a change of a feature amount obtained from each frame image, and correction amount update determining means for giving an instruction to update the correction amount when the cut point detecting means detects the cut point.

In another preferred construction, the video processing device further comprises lapse of fixed time detecting means for counting the number of frames from a frame image whose the correction amount is lastly updated to a current frame image to determine whether the number of frames exceeds a fixed value, cut point detecting means for detecting a cut point indicative of switching of a scene in the moving image based on a change of a feature amount obtained from each frame image, and correction amount update determining means for giving an instruction to update the correction amount either when detection of a lapse of a fixed time is made by the lapse of fixed time detecting means or when detection of the cut point is made by the cut point detecting means.

In another preferred construction, the correction amount obtaining means includes correction amount calculating means for calculating n (n≧1) kinds of arbitrary correction amounts, and the image correcting means includes n kinds (n≧1) of arbitrary correcting means.

In another preferred construction, the correction amount obtaining means includes at least one of white balance correction amount calculating means for calculating a white balance correction amount of the moving image, contrast correction amount calculating means for calculating a contrast correction amount of the moving image, saturation correction amount calculating means for calculating a saturation correction amount of the moving image, exposure correction amount calculating means for calculating an exposure correction amount of the moving image, sharpness correction amount calculating means for calculating a sharpness correction amount of the moving image, and preferable color correction amount calculating means for calculating a preferable color correction amount indicative of a correction amount required for a preset preferable color in the moving image, and the image correcting means includes at least one of white balance correcting means for conducting white balance correction of the moving image corresponding to the correction amount obtaining means, contrast correcting means for conducting contrast correction of the moving image, saturation correcting means for conducting saturation correction of the moving image, exposure correcting means for conducting exposure correction of the moving image, sharpness correcting means for conducting sharpness correction of the moving image, and preferable color correcting means for conducting the preferable color correction of the moving image.

In another preferred construction, the image correcting means conducts correction with respect to a moving image corrected by the image correcting means at a preceding stage based on a correction amount calculated by the correction amount obtaining means and the correction amount obtaining means calculates the correction amount of a moving image corrected by the image correcting means corresponding to the correction amount obtaining means at a preceding stage.

In another preferred construction, the correction amount obtaining means includes an evaluation region cutting-out means for cutting out an evaluation image region for calculating a correction amount from the frame image.

In another preferred construction, the correction amount obtaining means includes upper limit value adjusting means for comparing a correction amount obtained in advance and an upper limit value and when the value is larger than the upper limit value, replacing the value with a predetermined set value.

In another preferred construction, the correction amount change limiting means includes change amount calculating means for calculating an amount of change between a latest correction amount and a correction amount of a preceding frame and change amount limiting means for limiting an amount of change of the correction amount based on a maximum change range.

In another preferred construction, the cut point detecting means is structured to consider a result of comparison of a color histogram generated based on color information of each pixel of the moving image which is conducted on a frame basis as a feature amount and detect a cut point of the moving image based on a change of the feature amount.

In another preferred construction, the cut point detecting means is structured to, at the time of generating the color histogram from the moving image, generate the color histogram after thinning out the image at fixed intervals.

According to the second aspect of the invention, a video processing device comprises image input means for obtaining a frame image from sequentially applied moving images, and cut point detecting means for detecting a cut point indicative of switching of a scene in the moving image based on a change of a feature amount obtained from each frame image.

In the preferred construction, the cut point detecting means is structured to consider a result of comparison of a color histogram generated based on color information of each pixel of the moving image which is conducted on a frame basis as a feature amount and detect a cut point of the moving image based on a change of the feature amount.

In another preferred construction, the cut point detecting means is structured to, at the time of generating the color histogram from the moving image, generate the color histogram after thinning out the image at fixed intervals.

According to the third aspect of the invention, a video display device comprises moving image correction amount obtaining means for obtaining N (N≧1) kinds of correction amounts from sequentially applied moving images, image correcting means for conducting N (N≧1) kinds of quality improving corrections with respect to the moving image based on a correction amount obtained by the moving image correction amount obtaining means, and image display means for displaying a moving image corrected by the image correcting means.

According to another aspect of the invention, a video processing method comprising the steps of obtaining a correction amount from sequentially applied moving images, and conducting quality improving correction with respect to the applied moving image based on the obtained correction amount.

In the preferred construction, the video processing method comprising the steps of obtaining a correction amount from each frame image forming sequentially applied moving images, and conducting quality improving correction with respect to the frame image based on the obtained correction amount.

In another preferred construction, the video processing method comprising the steps of updating a correction amount for every N frames (N≧1).

In another preferred construction, the video processing method comprising the steps of checking the input moving image on a frame basis and when a cut point indicative of switching of a scene in the input moving image is detected, updating a correction amount.

In another preferred construction, the video processing method comprising the steps of updating a correction amount for every N frames (N≧1), and checking the input moving image on a frame basis and when a cut point indicative of switching of a scene in the input moving image is detected, updating a correction amount.

In another preferred construction, the video processing method comprising the steps of obtaining n (n≧1) kinds of arbitrary correction amounts at the time of obtaining the correction amount from the input moving image, and conducting n (N≧1) kinds of arbitrary quality improving corrections with respect to the input moving image based on the obtained correction amount.

In another preferred construction, the correction amount obtaining step includes at least one of the steps of calculating a white balance correction amount of the moving image, calculating a contrast correction amount of the moving image, calculating a saturation correction amount of the moving image, calculating an exposure correction amount of the moving image, calculating a sharpness correction amount of the moving image, and calculating a preferable color correction amount indicative of a correction amount required for a preset preferable color in the moving image, and the quality improving correction conducting step includes at least one of the steps of conducting white balance correction of the moving image corresponding to the correction amount obtaining step, conducting contrast correction of the moving image, conducting saturation correction of the moving image, conducting exposure correction of the moving image, conducting sharpness correction of the moving image, and conducting the preferable color correction of the moving image.

In another preferred construction, at the quality improving correction conducting step, correction is conducted with respect to a moving image corrected at the step of conducting quality improving correction at a preceding stage based on a correction amount calculated at the step of obtaining a correction amount, and at the correction amount obtaining step, the correction amount is calculated from a moving image corrected at the step of conducting quality improving correction corresponding to the step of obtaining a correction amount at a preceding stage.

In another preferred construction, the video processing method further comprising the step of limiting an amount of change between the obtained correction amount of a current frame and a stored correction amount of a preceding frame.

In another preferred construction, the video processing method further comprising the step of cutting out an evaluation image region necessary for obtaining the correction amount from the frame image, and obtaining the correction amount from the cut-out evaluation image.

In another preferred construction, the video processing method further comprising the step of at the detection of the cut point, considering a result of comparison of a color histogram generated based on color information of each pixel of the frame image which is conducted on a frame basis as a feature amount and detecting a cut point of the moving image based on a change of the feature amount.

In another preferred construction, the video processing method further comprising the step of when detecting the cut point, at the time of generating the color histogram from the frame image, generating the color histogram after thinning out the image at fixed intervals.

In another preferred construction, the video processing method further comprising the step of when a moving image partly flows on such a screen as a screen of a personal computer, before subjecting the moving image to correction processing, cutting out a region to be corrected from the moving image in question, subjecting the cut-out image to be corrected to image correction, and combining the region to be corrected which is subjected to image correction and a region not to be corrected which is a remainder left after the region to be corrected in question is cut out to output the combined image.

According to a further aspect of the invention, a video processing method comprising the steps of obtaining a frame image from sequentially applied moving images, and detecting a cut point indicative of switching of a scene in the moving image based on a change of a feature amount obtained from each frame image.

In the preferred construction, at the cut point detecting step, a result of comparison of a color histogram generated based on color information of each pixel of the moving image which is conducted on a frame basis is considered as a feature amount and a cut point of the moving image is detected based on a change of the feature amount.

In another preferred construction, at the cut point detecting step, at the time of generating the color histogram from the moving image, the color histogram is generated after thinning out the image at fixed intervals.

According to a still further aspect of the invention, a video processing program for controlling a computer to execute video processing, comprising the functions of obtaining at least one correction amount from moving images sequentially applied to the computer, comparing the obtained correction amount with a correction amount obtained from at least one of preceding past frames to suppress a change in correction amount, and subjecting a frame image to quality improving correction based on the suppressed correction amount.

As described in the foregoing, at the determination of a correction amount of a latest frame, by obtaining an amount of change between a correction amount of the latest frame and that of a past frame to minimize an amount of change to a degree that causes no flickering etc., the present invention enables quality of a moving image to be automatically improved without exhibiting uncomfortable look such as flickering.

Since according to the present invention, detection of a cut point enables detection of switching of a scene, quality improving can be conducted with an appropriate correction amount according to variation of scenes.

When a scene in a moving image is switched, an image whose look is different from that of the former image is applied to a system. Thus, when look of an image largely changes, an optimum correction amount for each image might be changed. Because of having the correction amount as a fixed parameter, the conventional methods fail to conduct correction of moving images with an appropriate correction amount.

Since upon detecting switching of a scene, the present invention is allowed to newly obtain an appropriate correction amount automatically by a moving image correction amount obtaining unit, it is possible to conduct correction for improving image quality with an appropriate correction amount for each different scene detected.

Because according to the present invention, when a cut point detection and in-frame correction amount obtaining unit evaluates an image, an evaluation region cut-out unit cuts an evaluation region to have an arbitrary area, automatic image improving is possible irrespective of difference in video sources.

Moving image has a display region largely varying depending on its input source. In a case of a TV image or a game image, the image is displayed on the entire region of a TV monitor. On the other hand, in a case of a hi-vision image, films and the like, upper and lower black zones are displayed to reduce an image display region.

The image quality improving correction method recited as an example in the present invention in some cases fails to obtain an appropriate correction amount due to the effect of the black zones. In contrast correction, for example, in which a correction amount is determined based on a dark region of a screen, when the whole of the screen is used as an evaluation region, the correction amount will be determined based on a region of upper and lower black zones to prevent optimum improving of quality of images at other region than the black zones.

Also as to the cut point detection exemplified in the preset invention, a cut point might not be detected appropriately because of the effects of the black zone. Using the evaluation region cut-out unit described here, however, solves these problems to enable appropriate cut-out of a scene and enable quality of a moving image to be improved with an appropriate correction amount.

Since according to the present invention, the video processing device is structured including a saturation correction unit, an exposure correction unit, a white balance correction unit, a contrast correction unit, a sharpness correction unit and a preferable color correction unit as still picture quality automatic improving techniques independently of each other in various combinations, various image quality improving corrections can be automatically conducted.

In addition, incorporation of not only the above-described six units but also other image quality improving unit enables the present invention to improve quality of a moving image in the same manner as the above six units do.

Since in cut point detection according to the present invention, thinned-out images are generated, cut point detection is possible irrespective of interlace characteristics.

The present invention is premised on various kinds of images such as a TV image and a DVD image as an input image. Among these images, two images are in some cases seen overlapped with each other in one frame. This is a phenomenon occurring when a video signal as an interlace image has 30 frames/sec, while the main moving images has 24 frames/sec. The difference in frame rates causes such a phenomenon that two images are seen overlapped with each other in one frame as described above.

When two images thus overlap with each other, an image of a preceding scene and an image of a succeeding scene are seen overlapped with other in one frame at a cut point. This results in increasing similarity between the preceding and the succeeding frames at the cut point to hinder cut point detection which has been described in relation to the above effects in some cases. Therefore, thinning out images to eliminate overlap of images enables cut point detection to be conducted more satisfactorily.

According to the present invention, since a moving image region in an input image can be cut out by a correction region cut-out unit at the time of image quality improving correction processing and because an image composing unit is provided for restoring cut out moving images subjected to image quality improving correction to such arrangement as in an original computer screen, out of an image in which a moving image flows at a part of a screen such as a computer screen, only the moving image region can be improved to have high quality and displayed.

On a computer screen, when an application for displaying moving images such as a media player is activated, there appears an image in which still picture forms a surrounding area and a moving image locally flows. The correction region cut-out unit cuts out such image into a still picture region and a moving image region. As a result, image quality improving correction can be made of the moving image region using an optimum correction amount.

Thus, the corrected moving image is combined with the surrounding still picture region by the image composing unit to have a moving image whose quality is improved with a correction amount optimum for a moving image, while display of the computer screen remains original display.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 28 is a diagram for use in explaining one example of conventional saturation automatic improving correction;

FIG. 29 is a diagram for use in explaining one example of conventional exposure automatic improving correction;

FIG. 31 is a diagram for use in explaining one example of conventional contrast automatic improving correction;

FIG. 32 is a diagram for use in explaining one example of conventional sharpness automatic improving correction;

FIG. 33 is a diagram for use in explaining one example of conventional preferable color correction;

DESCRIPTION OF THE PREFERRED EMBODIMENT

Figure 1:
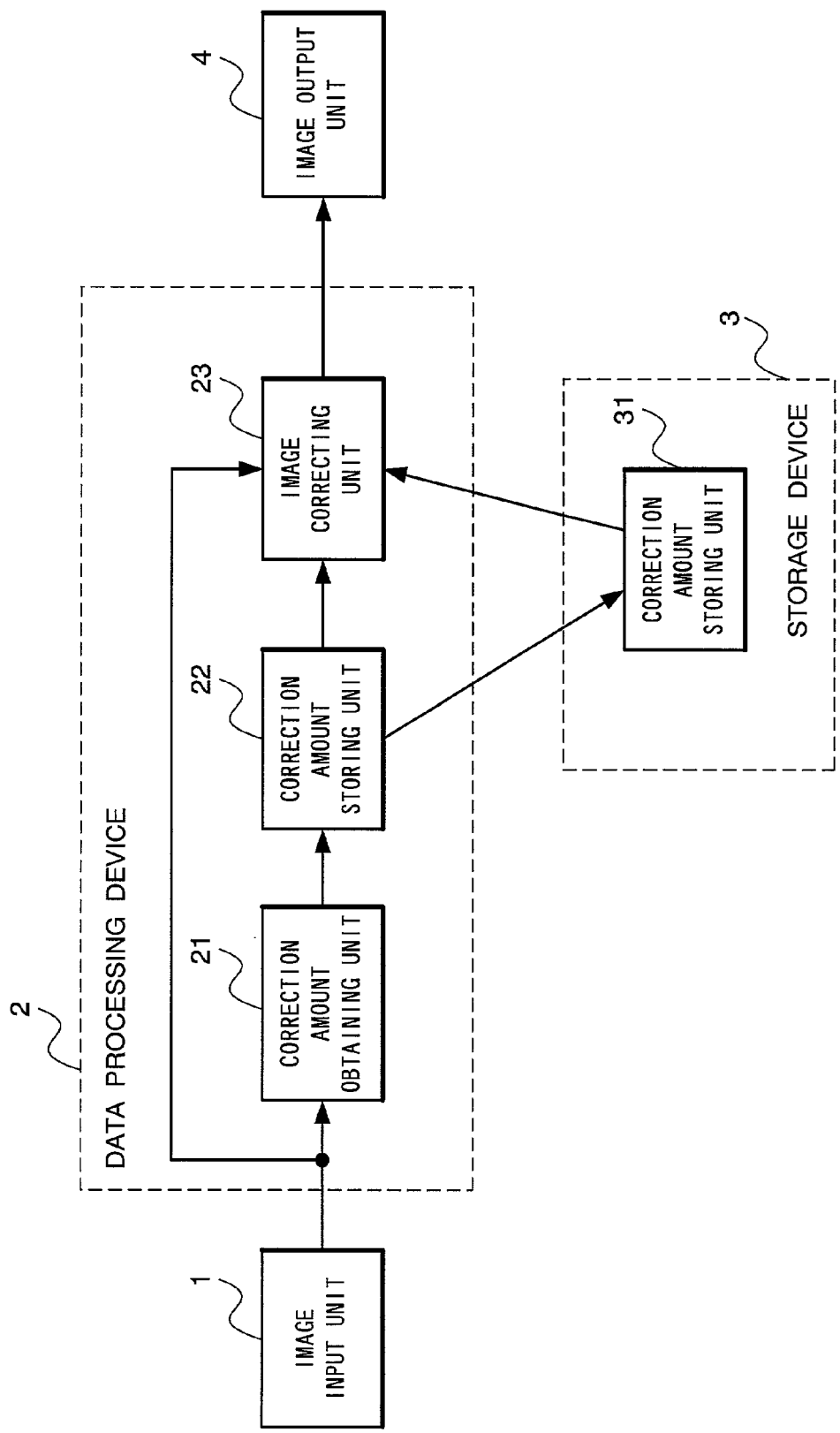
FIG. 1 is a block diagram showing a structure of a video processing device according to a first embodiment of the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention. FIG. 1 is a block diagram showing a structure of a video processing device according to a first embodiment of the present invention. In FIG. 1, the video processing device according to the first embodiment of the present invention includes an image input unit 1 to be connected with a DVD (Digital Versatile Disc) player, a computer, a game apparatus, a DV (Digital Video) camera, etc. to obtain a frame image forming an input moving image, a data processing device 2 operative by program control, a storage device 3 for storing information and an image output unit 4 for outputting a corrected frame image to the outside of the device.

The storage device 3 includes a correction amount storing unit 31. The correction amount storing unit 31 stores a latest correction amount. Correction amounts recorded are, an exposure correction amount, a white balance correction amount, a contrast correction amount, a saturation correction amount, a sharpness correction amount and the like. Contents to be stored are not limited to those mentioned here but vary with correction processing to be actually executed.

The data processing device 2 includes a correction amount obtaining unit 21, a correction amount storing unit 22 and an image correcting unit 23. The correction amount obtaining unit 21 calculates a correction amount from a frame image obtained from the image input unit 1. The correction amount storing unit 22 stores the correction amount obtained by the correction amount obtaining unit 21 at the correction amount storing unit 31.

The image correcting unit 23 subjects the frame image obtained from the image input unit 1 to quality improving correction using the correction amount stored in the correction amount storing unit 31 to output the corrected image to the image output unit 4.

Figure 2:
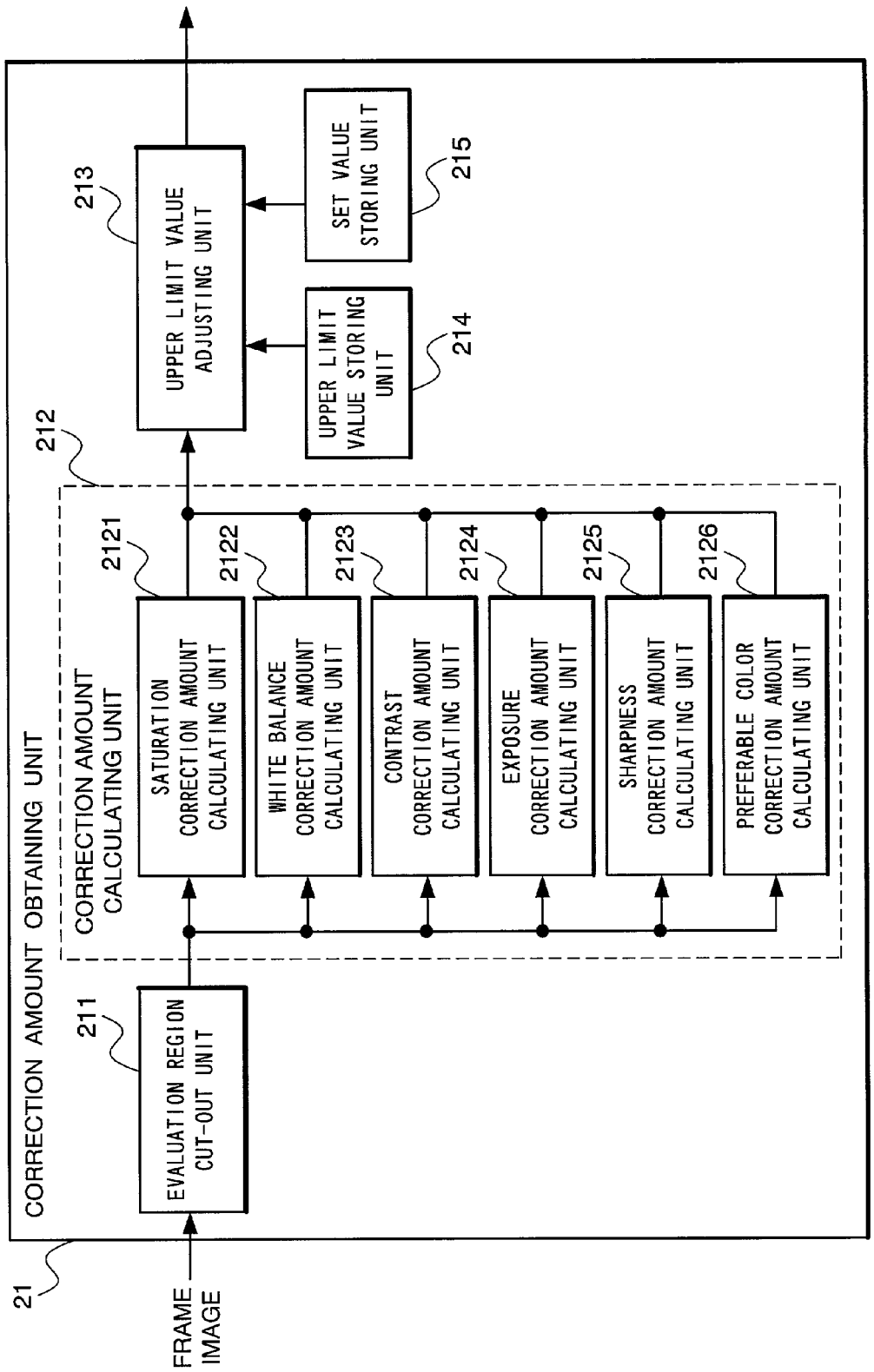
FIG. 2 is a block diagram showing a detailed structure of a correction amount obtaining unit illustrated in FIG. 1.

FIG. 2 is a block diagram showing a detailed structure of the correction amount obtaining unit 21 illustrated in FIG. 1. In FIG. 2, the correction amount obtaining unit 21 includes an evaluation region cut-out unit 211, a correction amount calculating unit 212, an upper limit value adjusting unit 213, an upper limit value storing unit 214 and a set value storing unit 215.

The evaluation region cut-out unit 211 cuts out an evaluation image region for use in calculating a correction amount from a frame image. The upper limit value storing unit 214 stores a maximum value that each correction amount can take. The set value storing unit 215 stores a default value of each correction amount.

The correction amount calculating unit 212 includes a saturation correction amount calculating unit 2121, a white balance correction amount calculating unit 2122, a contrast correction amount calculating unit 2123, an exposure correction amount calculating unit 2124, a sharpness correction amount calculating unit 2125 and a preferable color correction amount calculating unit 2126. Here, the correction amount calculating unit 212 may be structured without one or more of these correction amount calculating units. Also, these cited correction amount calculating units are examples only and other correction amount calculating unit may be incorporated. In FIG. 2, although the respective correction amount calculating units are illustrated in parallel to each other, they may sequentially execute their operation in an arbitrary order.

The saturation correction amount calculating unit 2121 extracts a feature amount from an image for evaluation which is cut out by the evaluation region cut-out unit 211 to determine a saturation correction amount based on the feature amount. The white balance correction amount calculating unit 2122 extracts a feature amount from an image for evaluation cut out by the evaluation region cut-out unit 211 to determine a white balance correction amount based on the feature amount.

The contrast correction amount calculating unit 2123 extracts a feature amount from an image for evaluation cut out by the evaluation region cut-out unit 211 to determine a contrast correction amount based on the feature amount. The exposure correction amount calculating unit 2124 extracts a feature amount from an image for evaluation cut out by the evaluation region cut-out unit 211 to determine an exposure correction amount based on the feature amount.

The sharpness correction amount calculating unit 2125 extracts a feature amount from an image for evaluation cut out by the evaluation region cut-out unit 211 to determine a sharpness correction amount based on the feature amount. The preferable color correction amount calculating unit 2126 extracts a feature amount from an image for evaluation cut out by the evaluation region cut-out unit 211 to determine a preferable color correction amount for the correction into a preset preferable color based on the feature amount.

Here, preferable color correction is intended to realize color that one finds preferable when looking only at a corrected image and is conducted based on the contents of know-how accumulated in a data base for a long period of time. More specifically, correction is conducted such that hues related to skin color, color of the sky and green of plants become hues which produce more preferable colors by adapting a color correction parameter given in advance according to each divisional hue region. As a result, more preferable colors are obtained with only the colors of skin, the sky and green of plants changed. As to the above-described preferable color correction, recitation is found in Literature 4.

When any of correction amounts obtained by the correction amount calculating unit 212 exceeds an upper limit value recorded in the upper limit value storing unit 214, the upper limit value adjusting unit 213 converts the amount into a set value stored in the set value storing unit 215.

Figure 3:
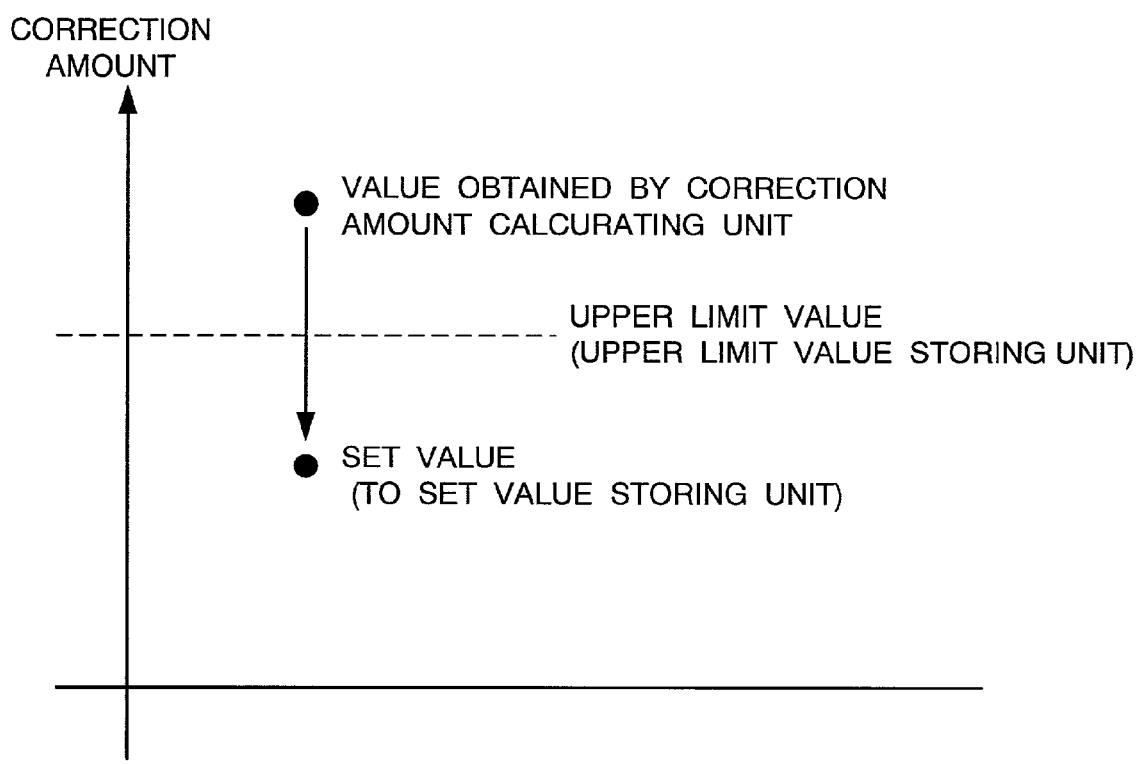
FIG. 3 is a diagram for use in explaining a method of adjusting a correction amount by the correction amount obtaining unit illustrated in FIG. 1 using an upper limit value and a set value.

FIG. 3 is a diagram for use in explaining a method of adjusting a correction amount by the correction amount obtaining unit 21 using an upper limit value and a set value. In FIG. 3, when any of the correction amounts obtained by the correction amount calculating unit 212 exceeds the upper limit value recorded in the upper limit value storing unit 214, the upper limit value adjusting unit 213 converts the amount into the set value recorded in the set value storing unit 215.

Figure 4:
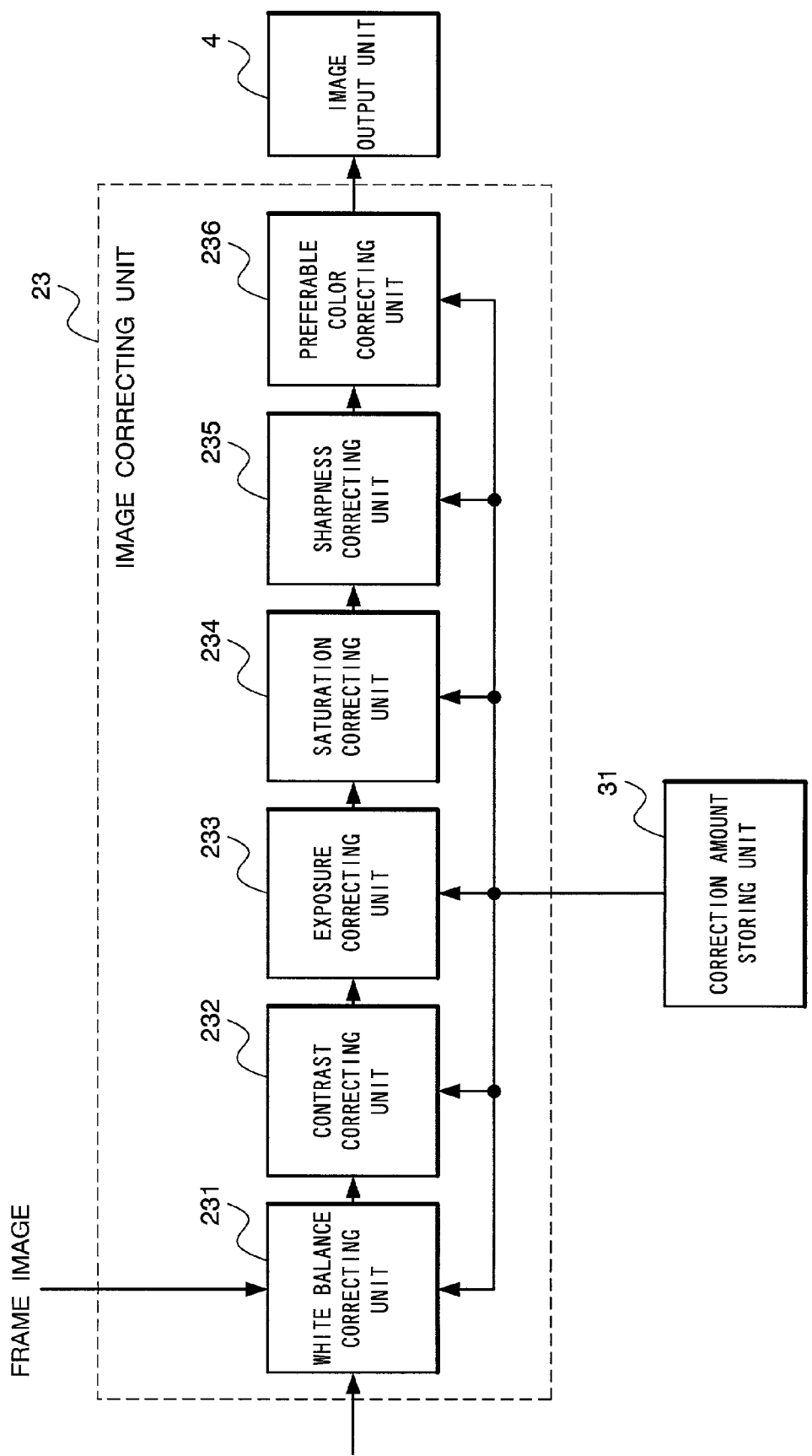
FIG. 4 is a block diagram showing an example of a detailed structure of an image correcting unit illustrated in FIG. 1.

FIG. 4 is a block diagram showing an example of a detailed structure of the image correcting unit 23 illustrated in FIG. 1. In FIG. 4, the image correcting unit 23 includes a white balance correcting unit 231, a contrast correcting unit 232, an exposure correcting unit 233, a saturation correcting unit 234, a sharpness correcting unit 235 and a preferable color correcting unit 236. The order how these correcting units are arranged is not limited to that illustrated in FIG. 4. The unit 23 may lack in one or more of these correcting units or may further include other correcting unit.

The white balance correcting unit 231 subjects an input frame image to white balance correction based on a white balance correction amount among the correction amounts recorded in the correction amount storing unit 31. The contrast correcting unit 232 subjects an input frame image to contrast correction based on a contrast correction amount among the correction amounts recorded in the correction amount storing unit 31.

The exposure correcting unit 233 subjects an input frame image to exposure correction based on an exposure correction amount among the correction amounts recorded in the correction amount storing unit 31. The saturation correcting unit 234 subjects an input frame image to saturation correction based on a saturation correction amount among the correction amounts recorded in the correction amount storing unit 31.

The sharpness correcting unit 235 subjects an input frame image to sharpness correction based on a sharpness correction amount among the correction amounts recorded in the correction amount storing unit 31. The preferable color correcting unit 236 subjects an input frame image to preferable color correction based on a preferable color correction amount among the correction amounts recorded in the correction amount storing unit 31.

Figure 5:
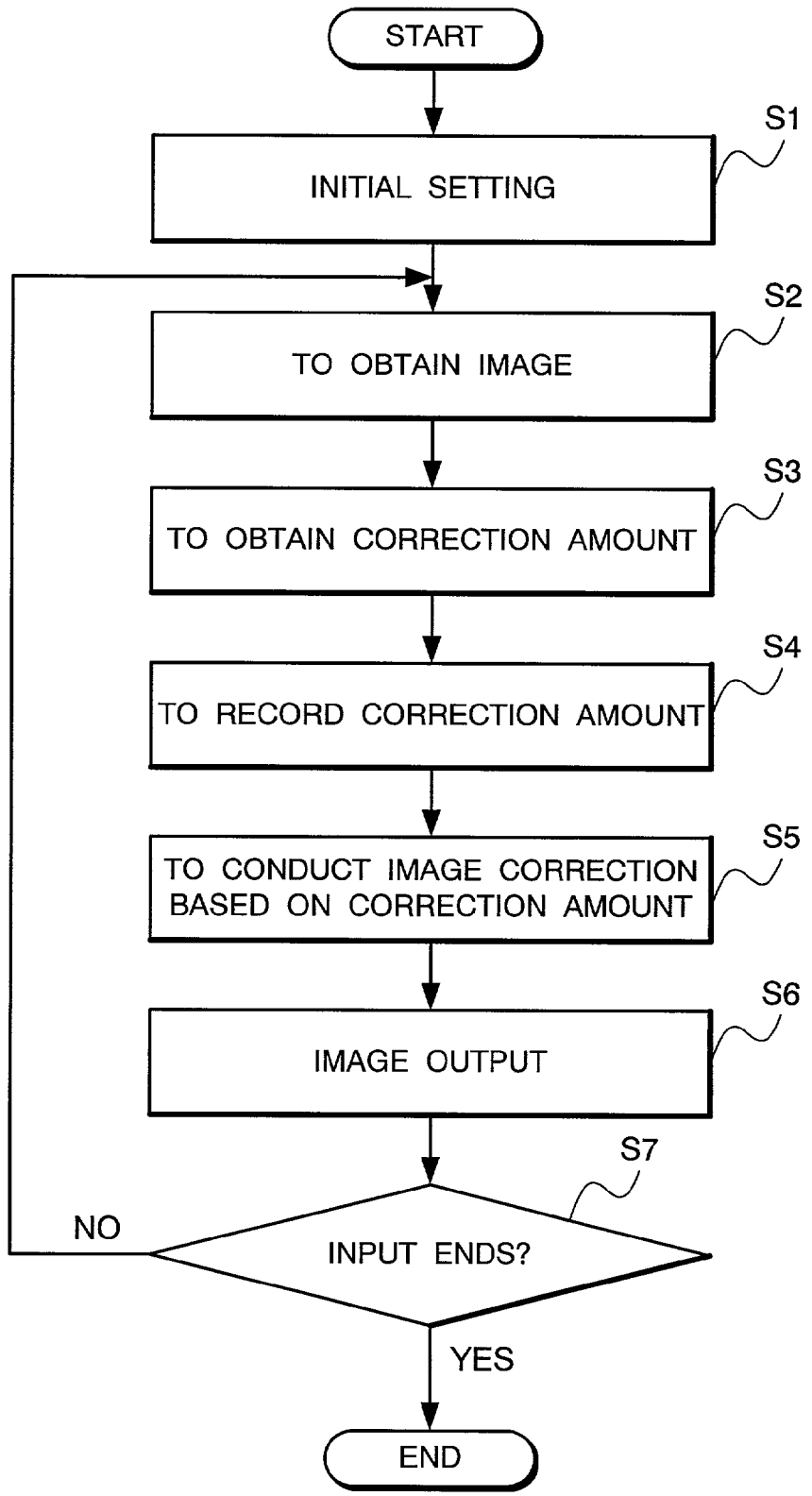
FIG. 5 is a flow chart showing operation of the video processing device according to the first embodiment of the present invention.
Figure 6:
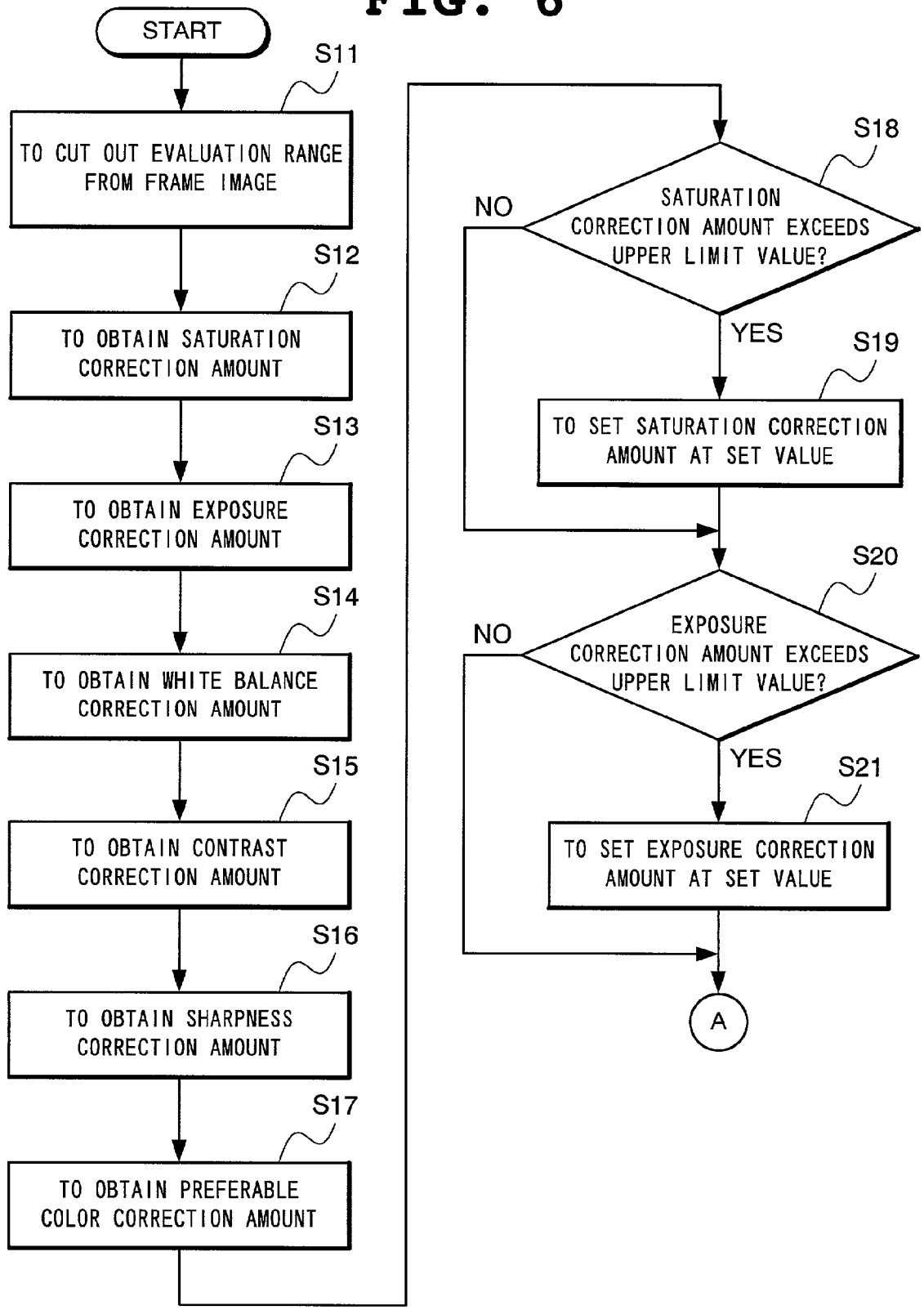
FIG. 6 is a flow chart showing operation of the correction amount obtaining unit illustrated in FIG. 1.
Figure 7:
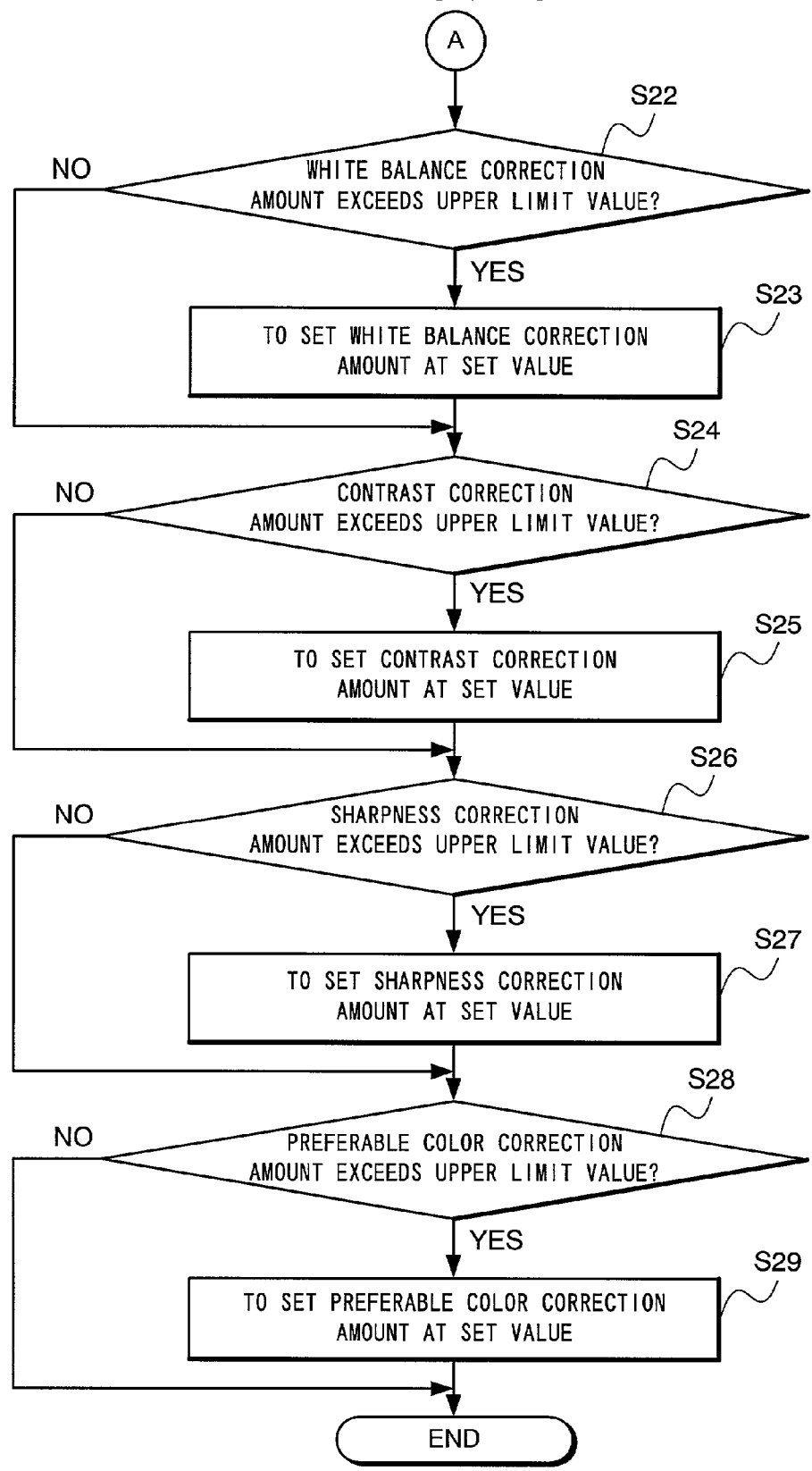
FIG. 7 is a flow chart showing operation of the correction amount obtaining unit illustrated in FIG. 1.

FIG. 5 is a flow chart showing operation of the video processing device according to the first embodiment of the present invention, while FIGS. 6 and 7 are flow charts showing operation of the correction amount obtaining unit 21 of FIG. 1. With reference to FIGS. 1 to 7, description will be made of the video processing device according to the first embodiment of the present invention.

When the processing is started, the video processing device first initializes a storage region, a variable and the like (Step S1 in FIG. 5). Thereafter, the video processing device obtains an image to be corrected (Step S2 in FIG. 5), calculates an image correction amount based on the obtained image (Step S3 in FIG. 5) and stores the calculated image correction amount (Step S4 in FIG. 5).

The video processing device subjects the input image to image correction processing based on the calculated correction amount (Step S5 in FIG. 5) to output the corrected image (Step S6 in FIG. 5). Subsequently, the video processing device determines whether an image is applied or not (Step S7 in FIG. 5) and when it is applied, returns to Step S2 to obtain the image and repeat the same processing as that described above. When no image is applied, the video processing device ends the processing.

Upon start of the processing, the correction amount obtaining unit 21 cuts out an evaluation region for obtaining a correction amount from the frame image (Step S11 in FIG. 6) and calculates a saturation correction amount for the cut out image for evaluation (Step S12 in FIG. 6).

Subsequent to the above-described processing, the correction amount obtaining unit 21 sequentially calculates an exposure correction amount (Step S13 in FIG. 6), a white balance correction amount (Step S14 in FIG. 6), a contrast correction amount (Step S15 in FIG. 6), a sharpness correction amount (Step S 16 in FIG. 6) and a preferable color correction amount (Step S17 in FIG. 6). The order of obtaining the respective correction amounts is not limited thereto. In addition, one or more of the above-described correction amounts can be omitted or other correction amount may be calculated.

Next, the correction amount obtaining unit 21 confirms an upper limit value of the obtained correction amount. First, the correction amount obtaining unit 21 checks whether the saturation correction amount exceeds an upper limit value (Step S18 in FIG. 6) and when it exceeds the upper limit value, sets the obtained saturation correction amount at the set value (Step S19 in FIG. 6) and unless it exceeds the upper limit value, the unit uses the previously obtained saturation correction amount.

Similarly, the correction amount obtaining unit 21 checks whether the exposure correction amount exceeds an upper limit value (Step S20 in FIG. 6) and when it exceeds the upper limit value, sets the obtained exposure correction amount at a set value (Step S21 in FIG. 6) and unless it exceeds the upper limit value, the unit uses the previously obtained exposure correction amount.

The correction amount obtaining unit 21 checks whether the white balance correction amount exceeds an upper limit value (Step S22 in FIG. 7) and when it exceeds the upper limit value, sets the obtained white balance correction amount at a set value (Step S23 in FIG. 7) and unless it exceeds the upper limit value, the unit uses the previously obtained white balance correction amount.

The correction amount obtaining unit 21 checks whether the contrast correction amount exceeds an upper limit value (Step S24 in FIG. 7) and when it exceeds the upper limit value, sets the obtained contrast correction amount at a set value (Step S25 in FIG. 7) and unless it exceeds the upper limit value, the unit uses the previously obtained contrast correction amount.

The correction amount obtaining unit 21 checks whether the sharpness correction amount exceeds an upper limit value (Step S26 in FIG. 7) and when it exceeds the upper limit value, sets the obtained sharpness correction amount at a set value (Step S27 in FIG. 7) and unless it exceeds the upper limit value, the unit uses the previously obtained sharpness correction amount.

Lastly, the correction amount obtaining unit 21 checks whether the preferable color correction amount exceeds an upper limit value (Step S28 in FIG. 7) and when it exceeds the upper limit value, sets the obtained preferable color correction amount at a set value (Step S29 in FIG. 7) and unless it exceeds the upper limit value, the unit uses the previously obtained preferable color correction amount. After executing the foregoing steps, the correction amount obtaining unit 21 ends the processing.

At the time of determining a correction amount of a latest frame, by thus obtaining an amount of change between the correction amount of the latest frame and that of a past frame to minimize the amount of change to a degree that causes no flickering etc., quality of a moving image can be automatically improved without exhibiting uncomfortable look such as flickering.

Moreover, because when the correction amount obtaining unit 21 evaluates an image, an evaluation region can be cut out to have an arbitrary size by the evaluation region cut-out unit 211, the present embodiment enables automatic quality improving irrespective of a video source.

Furthermore, since the video processing device according to the present embodiment is allowed to include the saturation correcting unit 234, the exposure correcting unit 233, the white balance correcting unit 231, the contrast correcting unit 232, the sharpness correcting unit 235 and the preferable color correcting unit 236 which are still picture automatic quality improving techniques in various combinations independently of each other, various kinds of high quality improving corrections can be automatically conducted. In addition, not only the above-described six units but also other high quality improving unit can be incorporated to improve quality of a moving image in the same manner as the above-described six correcting units do.

Figure 8:
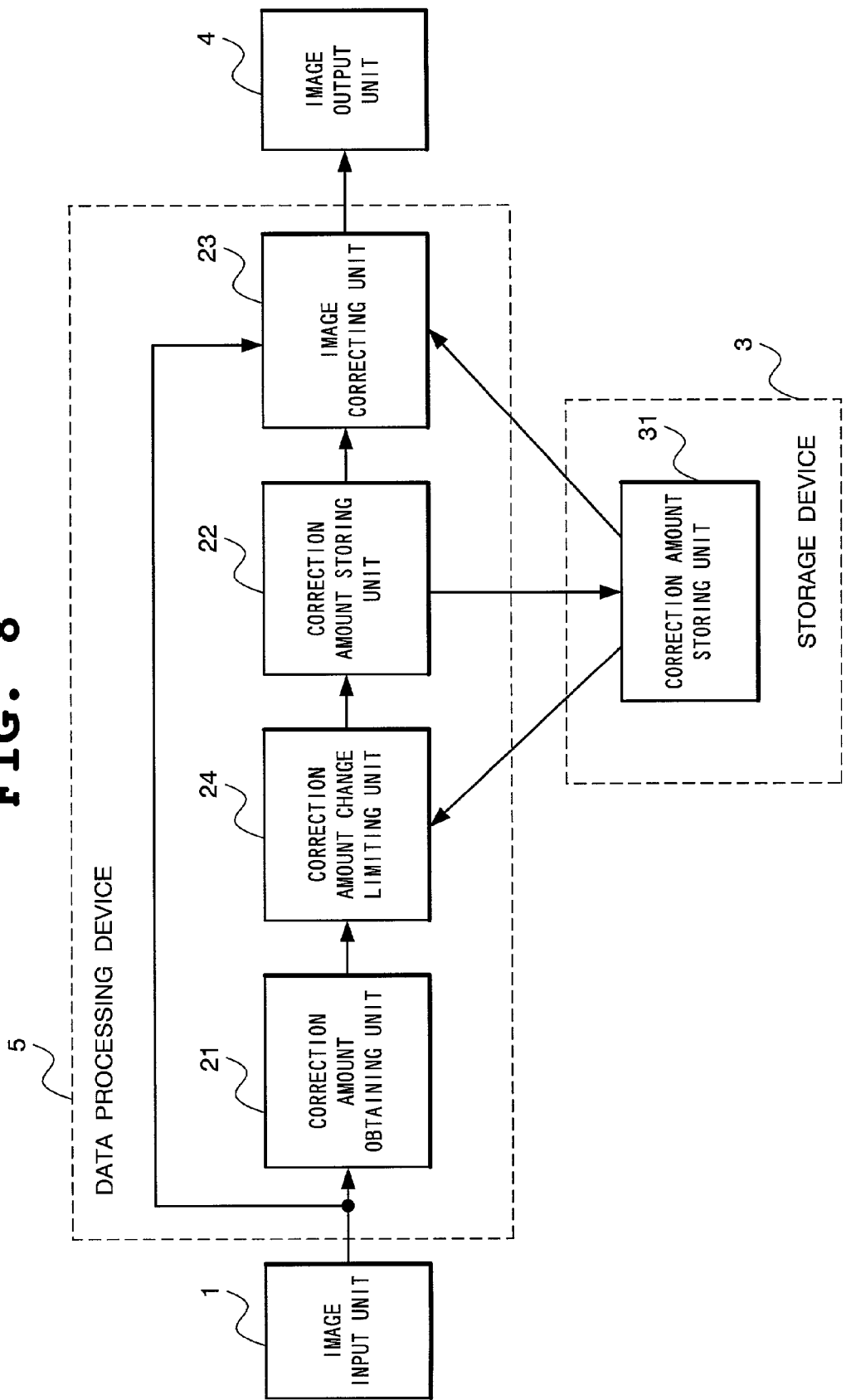
FIG. 8 is a block diagram showing a structure of a video processing device according to a second embodiment of the present invention.

FIG. 8 is a block diagram showing a structure of a video processing device according to a second embodiment of the present invention. In FIG. 8, the video processing device according to the second embodiment of the present invention has the same structure as that of the first embodiment of the present invention shown in FIG. 1 with the only difference being that the data processing device 5 is provided with a correction amount change limiting unit 24, in which the same components are indicated by the same reference numerals. Operation of the same components is also identical to that in the first embodiment.

The correction amount change limiting unit 24 compares a correction amount obtained by the correction amount obtaining unit 21 with a correction amount of a preceding frame to change the correction amount according to the comparison result so as not to make a change amount exceed a fixed value.

Figure 9:
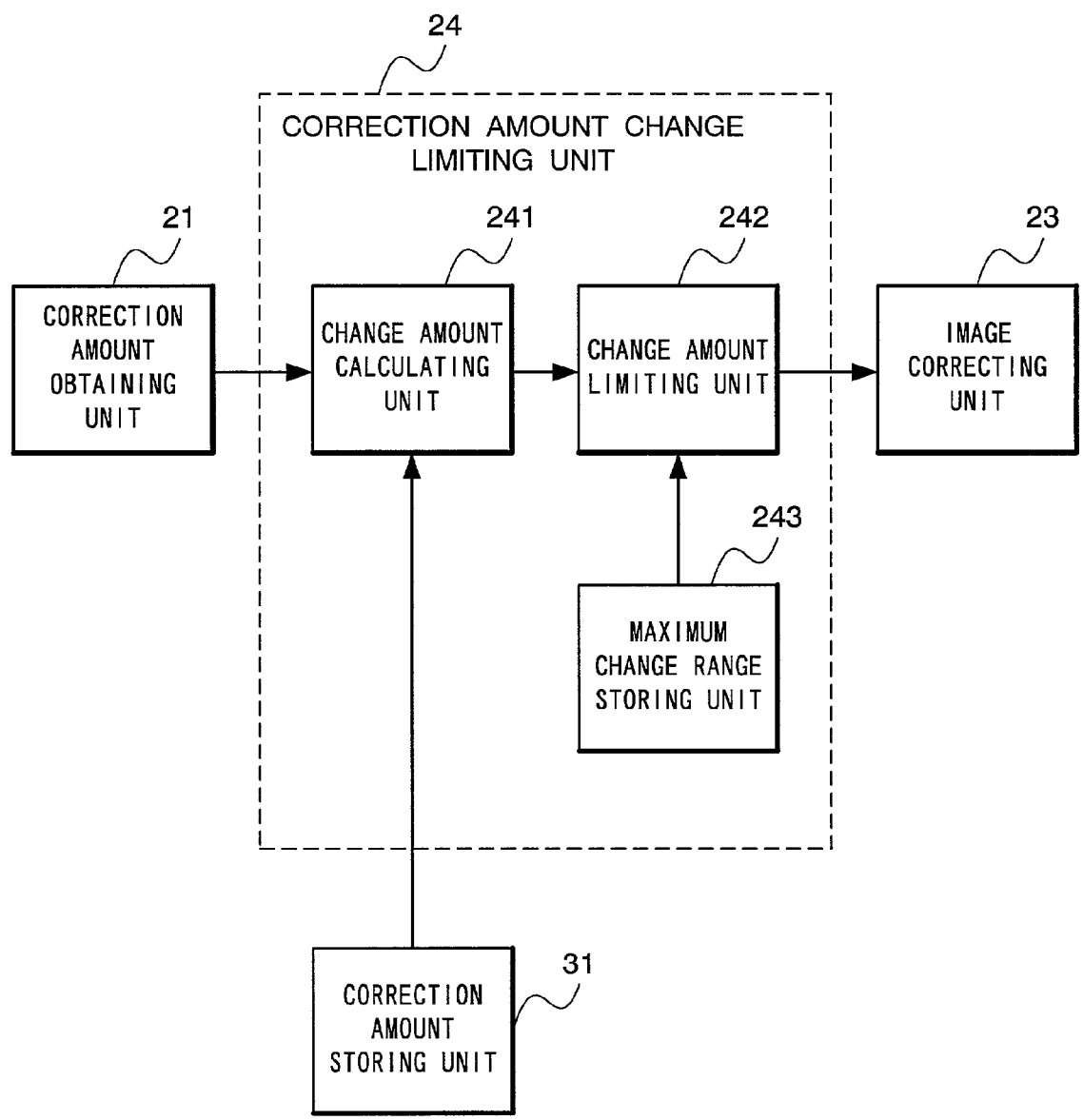
FIG. 9 is a block diagram showing a detailed structure of a correction amount change limiting unit illustrated in FIG. 8.

FIG. 9 is a block diagram showing a detailed structure of the correction amount change limiting unit 24 illustrated in FIG. 8. In FIG. 9, the correction amount change limiting unit 24 includes a change amount calculating unit 241, a change amount limiting unit 242 and a maximum change range storing unit 243.

The maximum change range storing unit 243 stores a maximum amount of allowable change from a correction amount of a preceding frame to a correction amount of a current frame in successive frame images.

The change amount calculating unit 241 obtains an absolute value of a difference between a correction amount of a latest frame obtained by the correction amount obtaining unit 21 and a correction amount of a preceding frame recorded in the correction amount storing unit 31 to acquire an amount of change in correction amount.

The change amount limiting unit 242 limits a correction amount of a current frame such that an amount of change in correction amount calculated by the change amount calculating unit 241 will not exceed a maximum change range recorded in the maximum change range storing unit 243.

Figure 10:
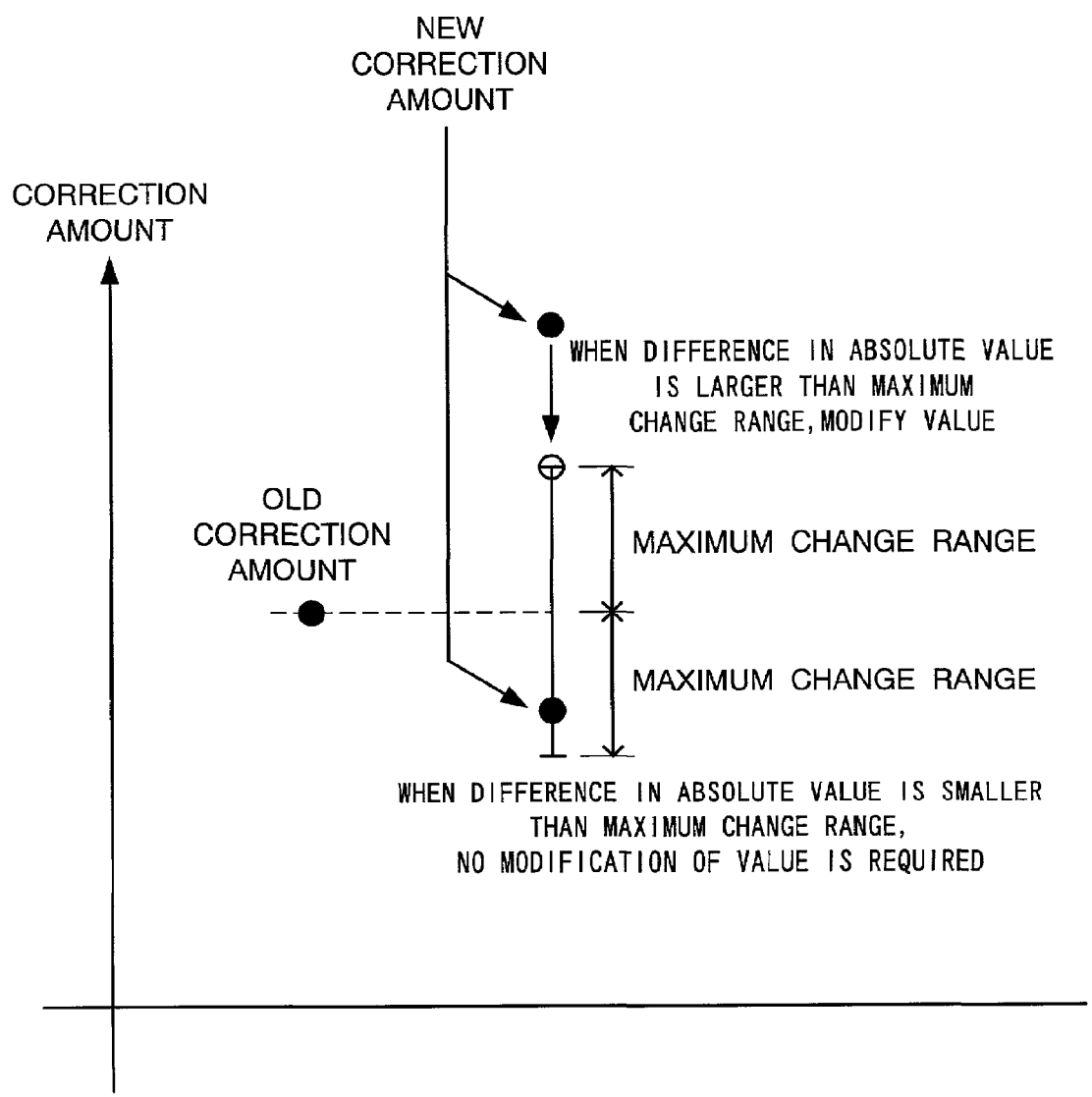
FIG. 10 is a diagram showing one example of processing conducted by the correction amount change limiting unit illustrated in FIG. 8.

FIG. 10 is a diagram showing one example of processing of the correction amount change limiting unit 24 illustrated in FIG. 8. As illustrated in FIG. 10, the correction amount change limiting unit 24 obtains an absolute value of a difference between a new correction amount and an old correction amount and when the value fails to exceed a maximum change range, outputs the correction amount of the current frame without modification.

If the absolute value of the difference exceeds the maximum change range, the change correction amount change limiting unit 24 limits the correction amount of the current frame by making the change amount meet the maximum change range such that the absolute value of the difference falls within the change range and outputs the limited correction amount.

Figure 11:
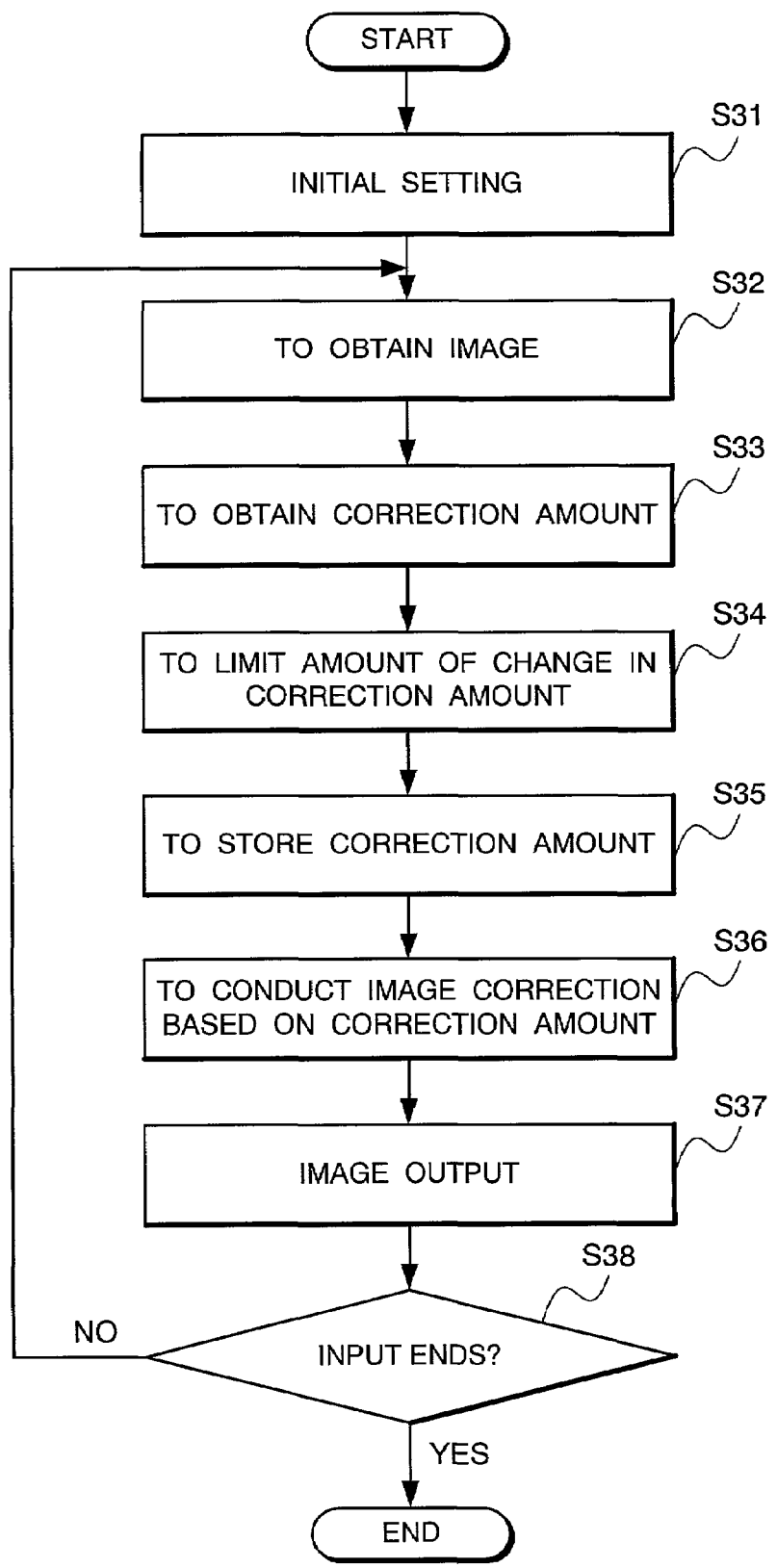
FIG. 11 is a flow chart showing operation of the video processing device according to the second embodiment of the present invention.

FIG. 11 is a flow chart showing operation of the video processing device according to the second embodiment of the present invention. With reference to FIGS. 8 to 11, description will be made of operation of the video processing device according to the second embodiment of the present invention. In FIG. 11, since processing operation at Steps S31 to S33 and S35 to S38 is the same as that of Steps S1 to S7 shown in FIG. 5, no description will be made thereof.

In the first embodiment of the present invention, when a correction amount is obtained from an input image, the correction amount is recorded without modification to subject the input image to image correction. On the other hand, in the present embodiment, after a correction amount is obtained (Step S33 in FIG. 11), an amount of change from a correction amount of a preceding frame when the correction amount is used without modification in image correction is limited within a fixed value (Step S34 in FIG. 11).

As described above, in the present embodiment, a correction amount whose amount of change in time is limited is recorded (Step S35 in FIG. 11) and based on the recorded amount, image correction is conducted with respect to the input image (Step S36 in FIG. 11).

As described in the foregoing, by suppressing an amount of change in time of a correction amount within a range in which no flickering is perceived, the present embodiment eliminates a phenomenon of unnatural look such as flickering. In other words, automatic improving of quality of moving images is realized by changing a correction amount by the correction amount change limiting unit 24 within a range where no flickering is perceived.

According to the conventional methods, applying the still picture quality improving techniques to each frame image of a moving image results in that a correction amount varies with each frame because image quality of each frame image slightly differs from each other. When an amount of correction changes largely in frame images adjacent to each other in time, look of the image changes instantly, so that flickering is perceived in a corrected moving image. The present embodiment solves the present problem.

Figure 12:
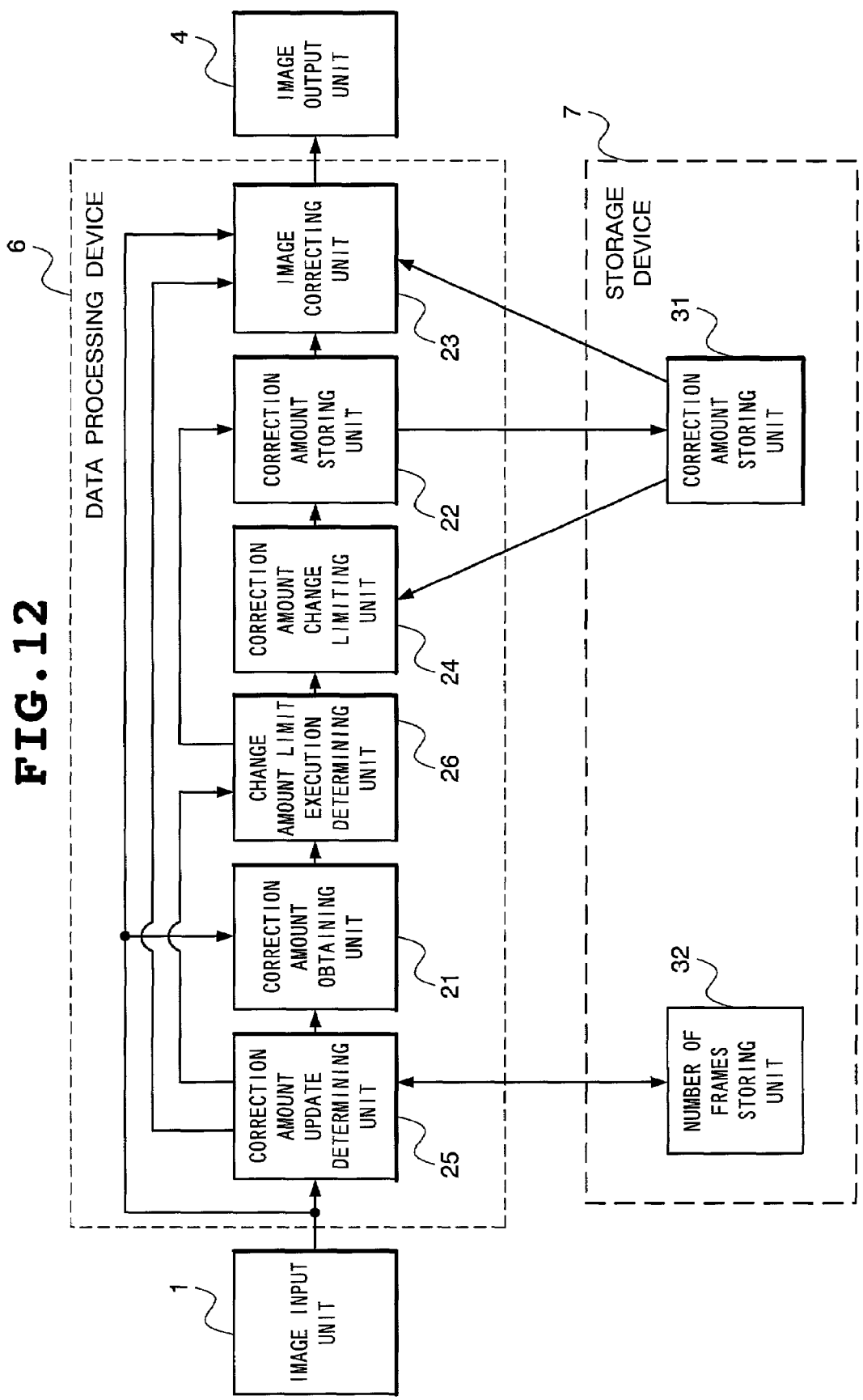
FIG. 12 is a block diagram showing a structure of a video processing device according to a third embodiment of the present invention.

FIG. 12 is a block diagram showing a structure of a video processing device according to a third embodiment of the present invention. In FIG. 12, the video processing device according to the third embodiment of the present invention has the same structure as that of the second embodiment of the present invention shown in FIG. 8 with the difference being that the data processing device 6 includes a correction amount update determining unit 25 and a change amount limit execution determining unit 26 and the storage device 7 includes a number of frames storing unit 32, in which the same components are indicated by the same reference numerals. In addition, operation of the counterpart components is the same as that of the second embodiment.

Upon obtaining an image from the image input unit 1, the correction amount update determining unit 25 increments the value of the number of frames storing unit 32 by one and detects a cut point from the obtained frame image or when detecting the value of the number of frames storing unit 32 exceeding a fixed value, determines to update the correction amount. In other words, the correction amount update determining unit 25 generates a cut point detection signal when detecting a cut point and generates a lapse of fixed time signal when detecting a fixed time elapsing.

The change amount limit execution determining unit 26 determines whether to execute the correction amount change limiting unit 24 by a signal received from the correction amount update determining unit 25. More specifically, upon receiving the lapse of fixed time signal from the correction amount update determining unit 25, the change amount limit execution determining unit 26 sends the correction amount obtained from the correction amount obtaining unit 21 to the correction amount change limiting unit 24 and upon receiving the cut point detection signal from the correction amount update determining unit 25, sends the correction amount to the correction amount storing unit 22.

Figure 13:
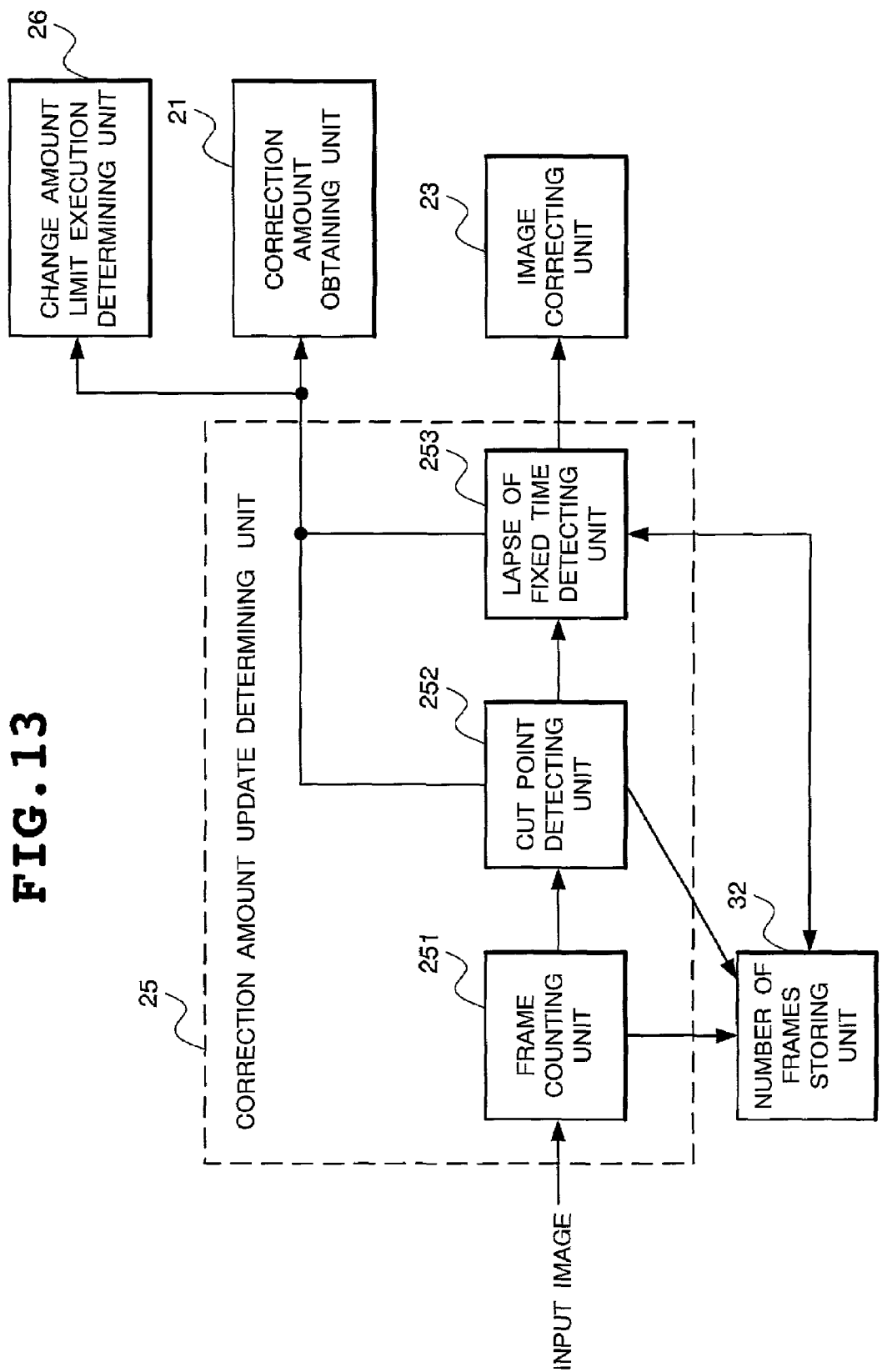
FIG. 13 is a block diagram showing a detailed structure of a correction amount update determining unit illustrated in FIG. 11.

FIG. 13 is a block diagram showing a detailed structure of the correction amount update determining unit 25 illustrated in FIG. 12. In FIG. 13, the correction amount update determining unit 25 includes a frame counting unit 251, a cut point detecting unit 252 and a lapse of fixed time detecting unit 253.

When a frame is switched in an input image, the frame counting unit 251 increments the number of frames stored in the number of frames storing unit 32 by one. The cut point detecting unit 252 extracts a feature amount from the input image and compares the feature amount with a feature amount extracted from a preceding frame to detect a cut point. Upon detection of a cut point, the frame counting unit 251 outputs the cut point detection signal to reset the number of frames storing unit 32.

The lapse of fixed time detecting unit 253 checks the number of frames stored in the number of frames storing unit 32 to find whether the number exceeds a fixed value. Upon detecting the fixed time elapsing, the lapse of fixed time detecting unit 253 outputs the lapse of fixed time signal to reset the number of frames storing unit 32.

Figure 14:
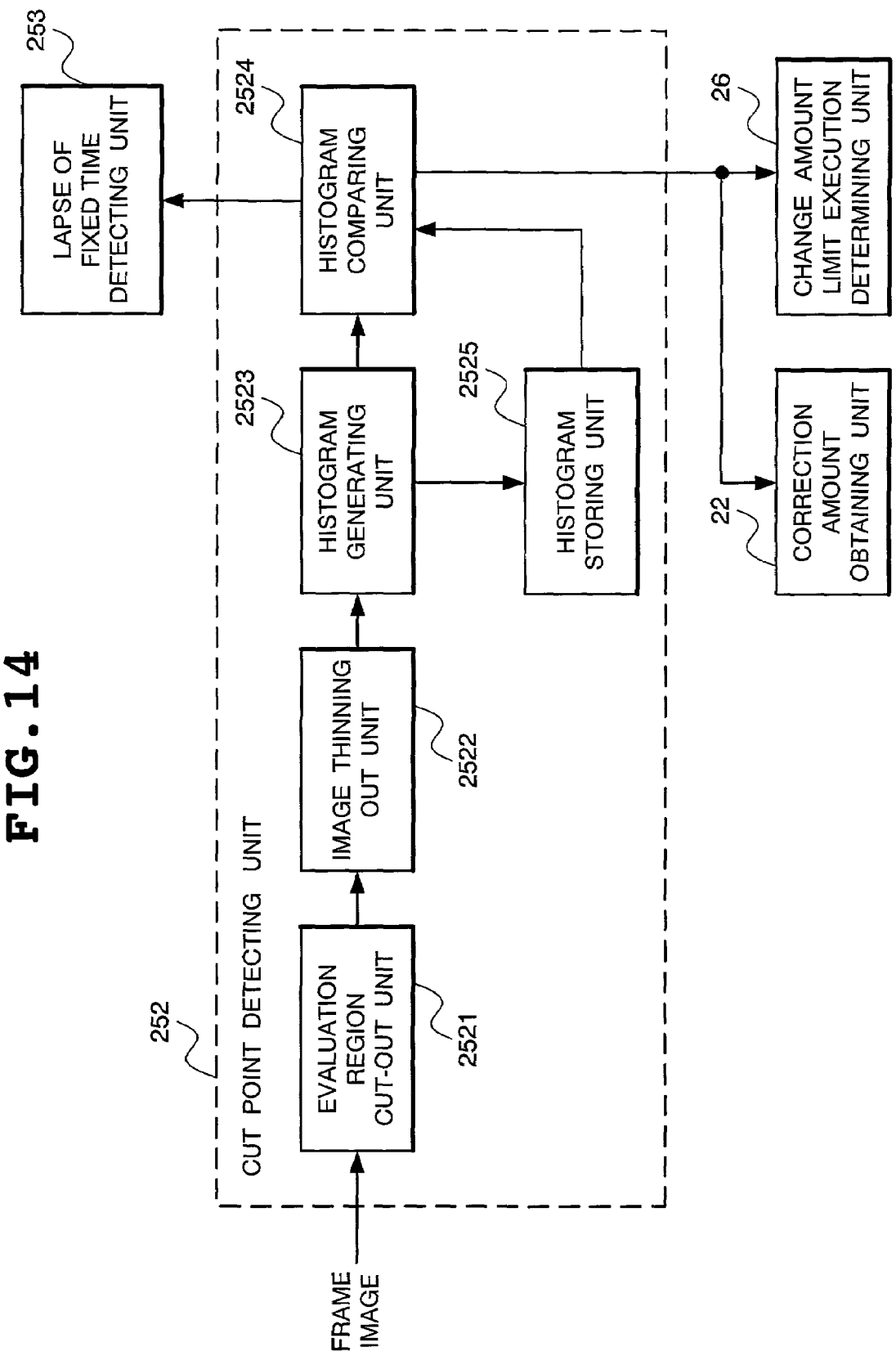
FIG. 14 is a block diagram showing a detailed structure of a cut point detecting unit illustrated in FIG. 13.

FIG. 14 is a block diagram showing a detailed structure of the cut point detecting unit 252 of FIG. 13. In FIG. 14, the cut point detecting unit 252 includes an evaluation region cut-out unit 2521, an image thinning out unit 2522, a histogram generating unit 2523, a histogram comparing unit 2524 and a histogram storing unit 2525.

Figure 15:
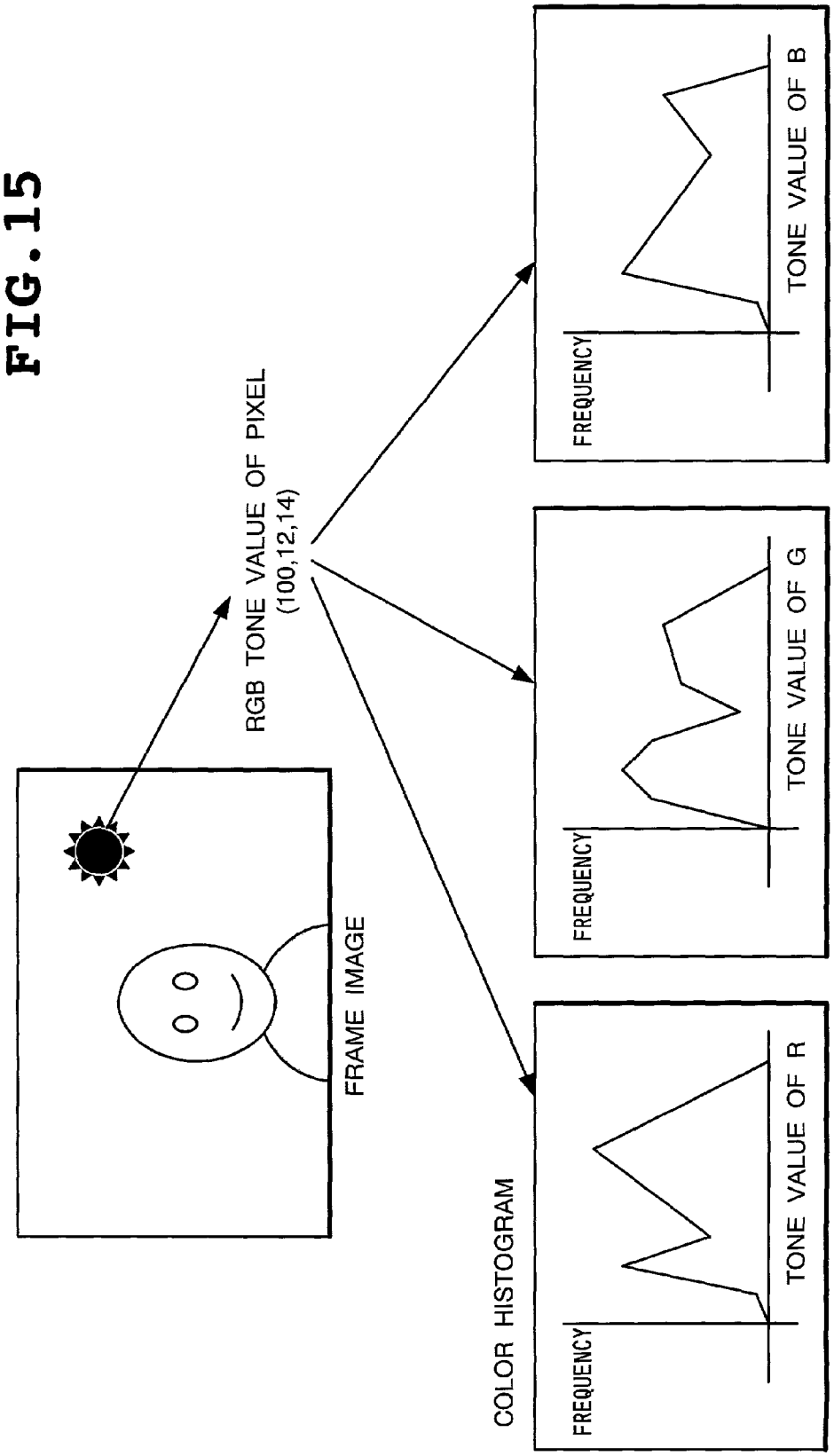
FIG. 15 is a diagram for use in explaining a color histogram for use in the cut point detecting unit shown in FIG. 13.
Figure 16:
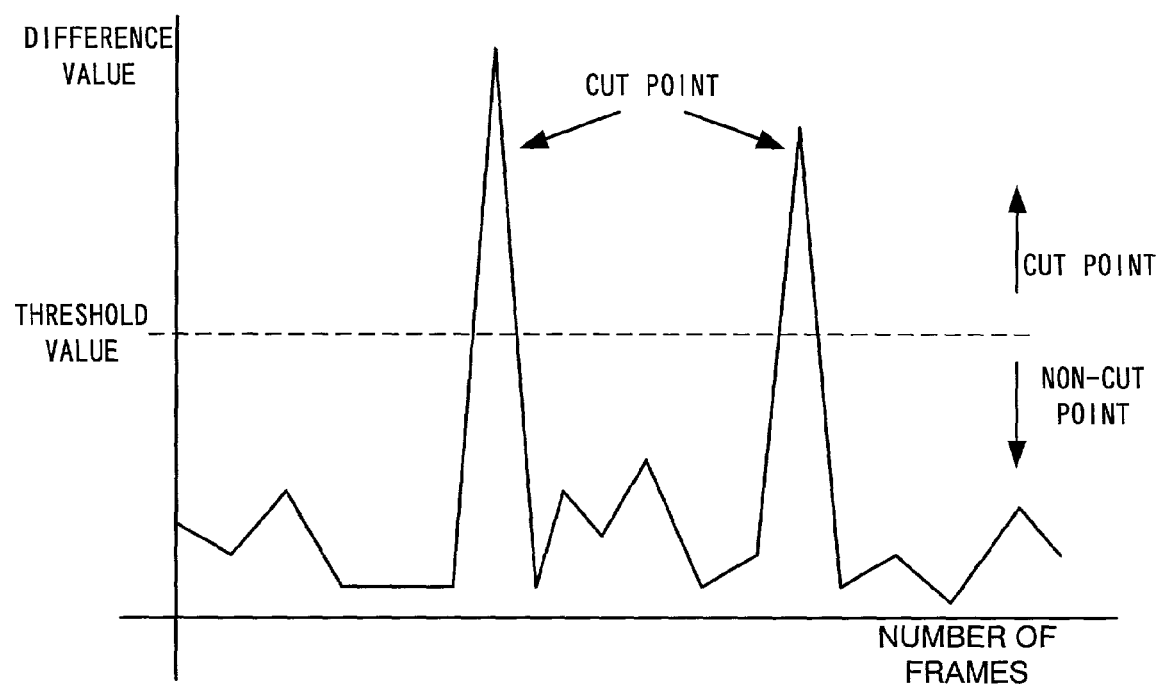
FIG. 16 is a diagram showing a relationship between transition of a difference value and a threshold value in an example of feature point comparison for use in the cut point detecting unit of FIG. 13.

FIG. 15 is a diagram for use in explaining a color histogram for use in the cut point detecting unit 252 of FIG. 13, while FIG. 16 is a diagram showing a relationship between transition of a difference value and a threshold value in the example of comparison in feature points used in the cut point detecting unit 252 of FIG. 13. With reference to FIGS. 14 to 16, operation of the cut point detecting unit 252 will be described.

The evaluation region cut-out unit 2521 cuts out an image region for use in cut point detection from an input frame image. The image thinning out unit 2522 extracts every n pixels (n≧1) from the image cut out by the evaluation region cut-out unit 2521 and combines the extracted pixels to generate a thinned out image.

The histogram generating unit 2523 generates a color histogram based on color information of each pixel of the input frame image. Color histogram is, as illustrated in FIG. 15, a histogram generated independently for each of the RGB values as color information of each pixel of the frame image.

The histogram storing unit 2525 stores a histogram extracted from a preceding frame. The histogram comparing unit 2524 compares the color histogram generated by the histogram generating unit 2523 and the color histogram of the preceding frame stored in the histogram storing unit 2525 to determine whether a cut point exists between the frames based on the obtained feature amounts.

Although used here as histogram comparison processing conducted by the histogram comparing unit 2524 are techniques using a difference value and a correlation value of a histogram and the like, the techniques are not specifically limited. Description will be here made of a case where a difference value of a histogram is used.

With a difference value of a histogram used, as a frame changes, its difference value changes as shown in FIG. 16. Between frames where a cut point exists, its difference value is apt to be larger than other points. Therefore, as illustrated in FIG. 16, by providing a threshold value to classify the points into a cut point when a difference value is larger than the threshold value and into a non-cut point when the same is smaller, cut point detection is enabled. This cut point detection method is applicable not only to such video processing as in the present embodiment but also to compression of images, generation of a digest from video and the like.

Figure 17:
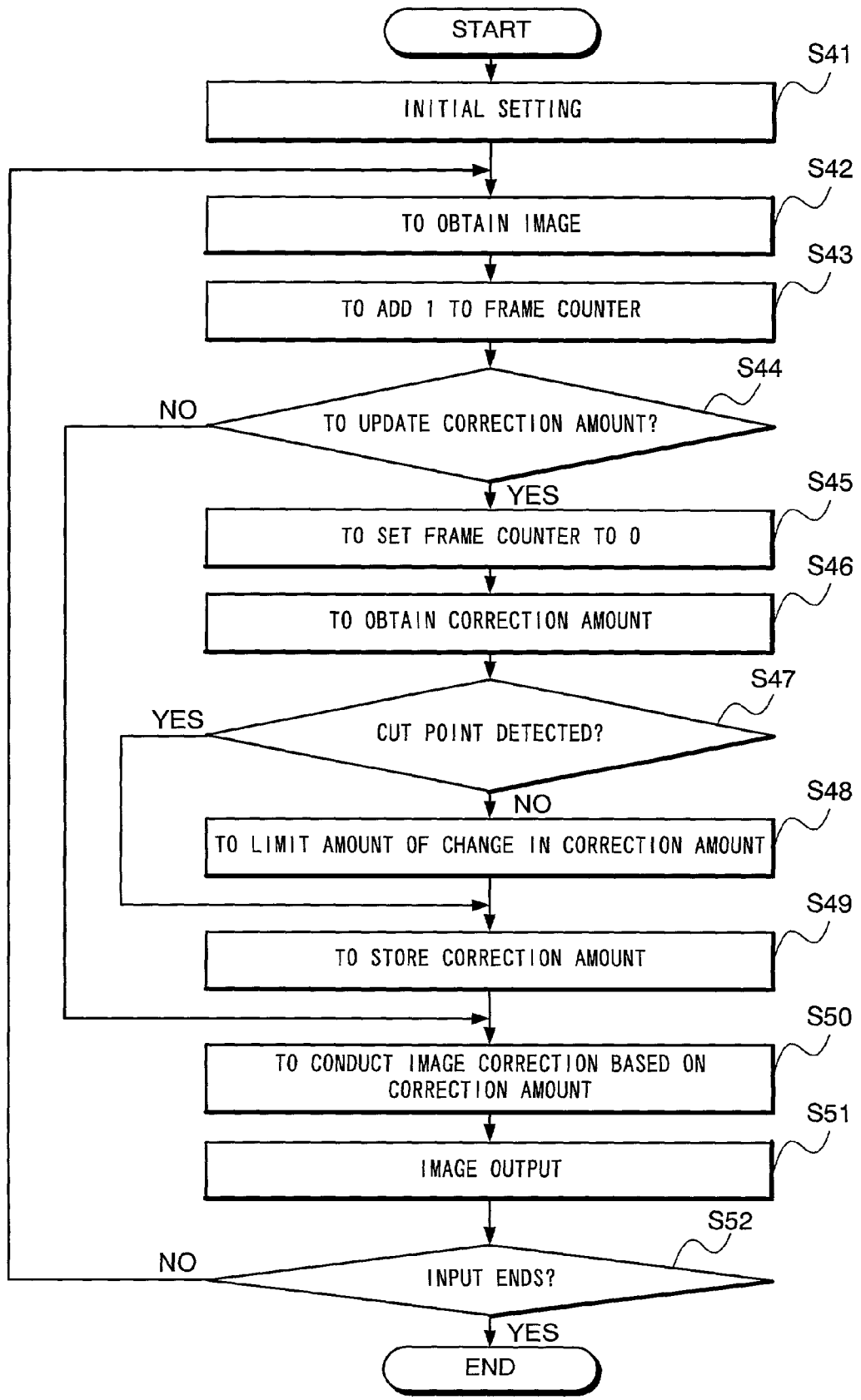
FIG. 17 is a flow chart showing operation of the video processing device according to the third embodiment of the present invention.

FIG. 17 is a flow chart showing operation of the video processing device according the third embodiment of the present invention. With reference to FIGS. 12, 13 and 17, description will be made of the video processing device according to the third embodiment of the present invention. Since processing operation at Steps S41, S42, S46, S48, S49 and S50 to S52 is the same as that at Steps S31 to S38 in FIG. 11, no description will be made thereof.

In the second embodiment of the present invention, when a correction amount is obtained from an input image, a range of an amount of allowable change between the obtained correction amount and a correction amount obtained from a preceding frame is limited. On the other hand, in the present embodiment, first add one to the frame counting unit 251 every time a new frame image is input (Step S43 in FIG. 17).

In the present embodiment, when detecting a cut point in an input image or when the count of the frame counting unit 251 exceeds a fixed value, determination is made to update a correction amount (Step S44 in FIG. 17). When the correction amount will not be updated, image correction is conducted using a current correction amount (Step S50 in FIG. 17).

When the correction is to be updated, reset the frame counting unit 251 to 0 (Step S45 in FIG. 17) to obtain a correction amount from the current frame image (Step S46 in FIG. 17). At this time, when a cut point has been detected (Step S47 in FIG. 17), record the correction amount here (Step S49 in FIG. 17) to conduct image correction. When no cut point has been detected (Step S47 in FIG. 17), limit the amount of change in a correction amount (Step S48 in FIG. 17) and record the correction amount whose change amount is limited (Step S49 in FIG. 17) to conduct image correction.

Figure 18:
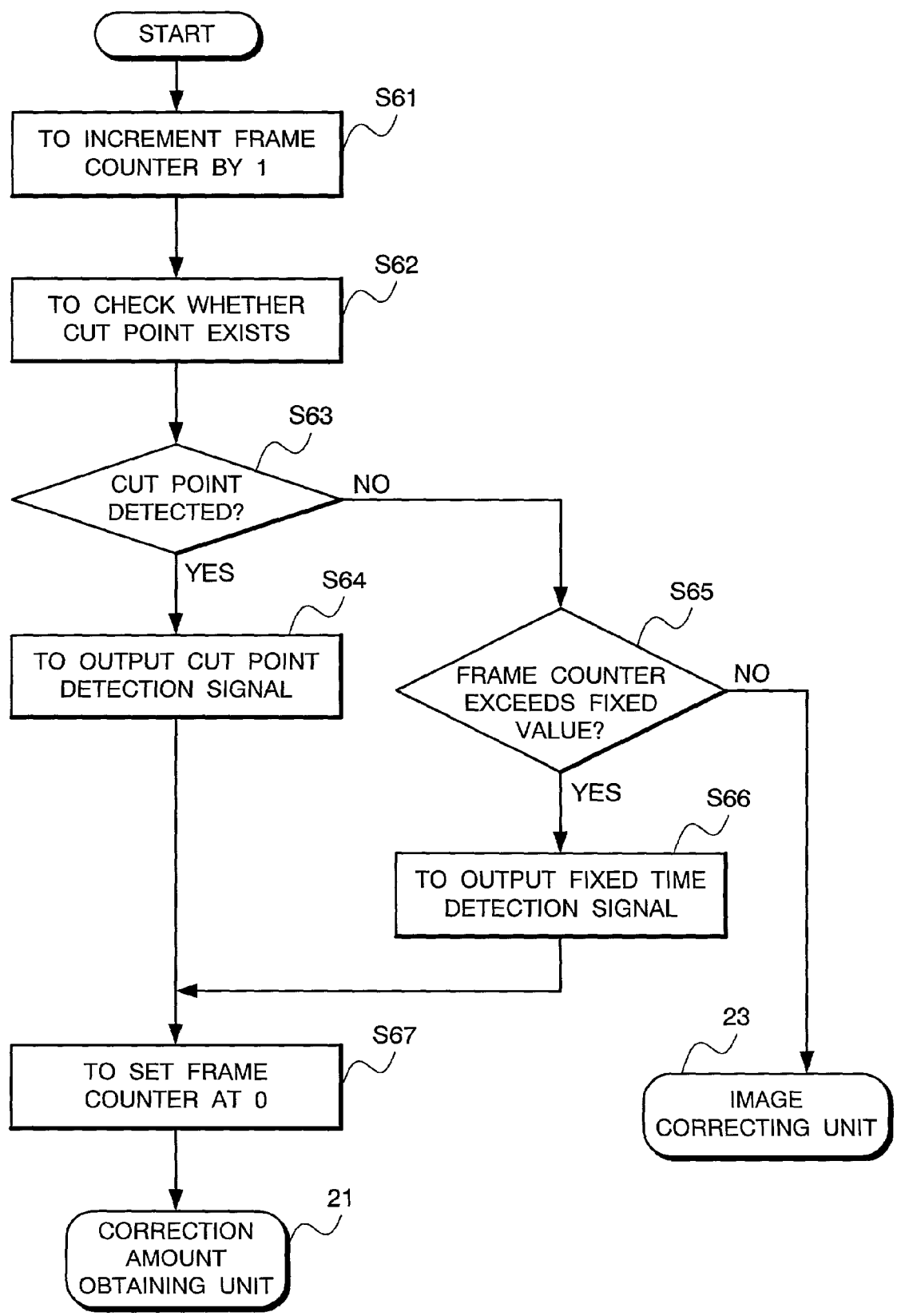
FIG. 18 is a flow chart showing operation of the correction amount update determining unit illustrated in FIG. 12.

FIG. 18 is a flow chart showing operation of the correction amount update determining unit 25 illustrated in FIG. 12. With reference to FIGS. 12, 13 and 18, description will be made of operation of the correction amount update determining unit 25.

Upon start of the processing, the correction amount update determining unit 25 increments the frame counting unit 251 by one (Step S61 in FIG. 18) to check whether a cut point exists or not based on the frame image (Step S62 in FIG. 18).

The correction amount update determining unit 25 checks whether a cut point is detected or not (Step S63 in FIG. 18) and if it is detected, outputs the cut point detection signal (Step S64 in FIG. 18) to reset the frame counting unit 251 to 0 (Step S67 in FIG. 18) and shifts the processing to the correction amount obtaining unit 21.

When no cut point is detected, the correction amount update determining unit 25 checks whether the count of the frame counting unit 251 exceeds a fixed value or not (Step S65 in FIG. 18) and if it exceeds the fixed value, outputs a fixed time detection signal (Step S66 in FIG. 18) to set the frame counting unit 251 to 0 (Step S67 in FIG. 18) and shifts the processing to the correction amount obtaining unit 21. Upon determining that the count exceeds the fixed value, the correction amount update determining unit 25 shifts the processing directly to the image correcting unit 23.

Figure 19:
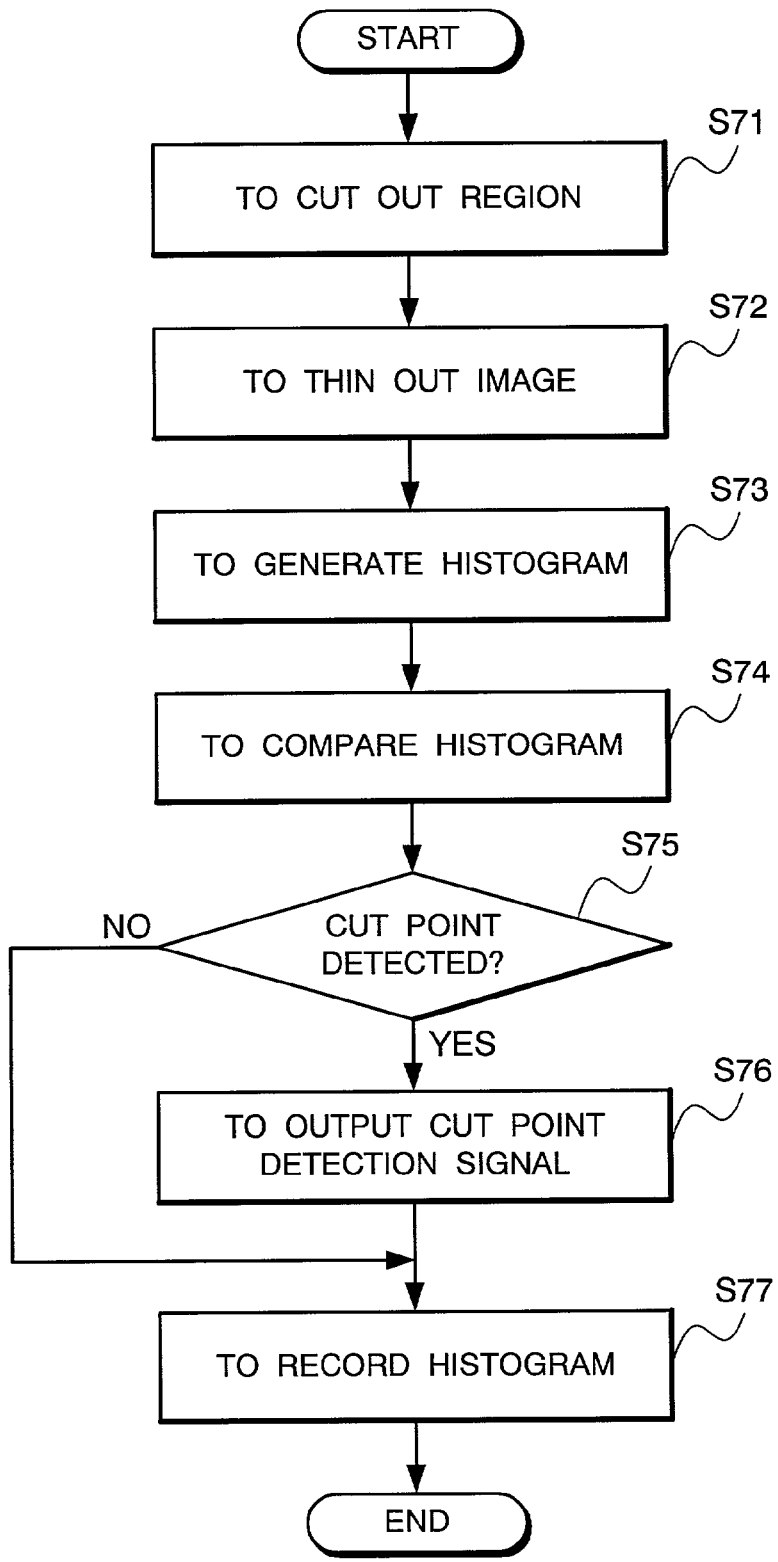
FIG. 19 is a flow chart showing operation of the cut point detecting unit illustrated in FIG. 13.

FIG. 19 is a flow chart showing operation of the cut point detecting unit 252 illustrated in FIG. 13. With reference to FIGS. 13, 14 and 19, description will be made of operation of the cut point detecting unit 252.

Upon start of the processing, the cut point detecting unit 252 cuts out an image region for use in detecting a cut point from a frame image (Step S71 in FIG. 19), extracts every n pixels (n≧0) from the cut-out image and combines the extracted pixels to form a thinned out image (Step S72 in FIG. 19).

The cut point detecting unit 252 generates a histogram based on the thinned-out image (Step S73 in FIG. 19) and compares the histogram with a histogram of a preceding frame (Step S74 in FIG. 19).

Based on the result of the comparison, the cut point detecting unit 252 checks whether a cut point is detected or not (Step S75 in FIG. 19), and when it is detected, outputs the cut point detection signal (Step S76 in FIG. 19) and records the histogram generated by the present processing (Step S77 in FIG. 19) to end the processing.

In the present embodiment, since detection of a cut point enables detection of switching of a scene, quality improving can be conducted with an appropriate correction amount according to different scenes.

When a scene in a moving image is switched, an image whose look differs from that of preceding images is applied to the system. When look of an image thus changes largely, a correction amount appropriate for each image might change in some cases.

With conventional methods, correction of a moving image with an appropriate correction amount is impossible because they use a correction amount as a fixed parameter. On the other hand, according to the present invention, when switching of a scene is detected, a new appropriate correction amount is automatically obtained by the correction amount obtaining unit 21. Therefore, quality improving can be conducted with an appropriate correction amount according to each different scene detected.

Moving image has a display region largely differing with its input source. In TV images and game images, images are displayed in the entire area of a TV monitor. On the other hand, in hi-vision images, films, etc., black zones are displayed at upper and lower regions to have a smaller image display region.

In the present embodiment, there occurs a case where due to the black zone, an appropriate correction amount can not be obtained. In contrast correction, for example, a correction amount is determined based on a dark region of a screen. When the whole of the screen is used as an evaluation region, a correction amount will be determined based on the region of upper and lower black zones to disable appropriate improving of quality of an image at other region than the black zones.

Similarly in cut point detection, a cut point might not be detected appropriately due to the effect of the black zones in some cases. It is, however, possible by the use of the here described evaluation region cut-out unit 211 to solve these problems and to appropriately cut a scene to improve quality of a moving image with an appropriate correction amount.

Since according to the present invention, thinned-out images are generated at the time of cut point detection, a cut point can be detected irrespective of interlace characteristics. In the present embodiment, it is premised that various kinds of images such as a TV image and a DVD image exist as an input image. Among these images, two images are seen overlapped with each other in one frame in some cases. This is a phenomenon occurring when a video signal as an interlace image has 30 frames/sec, while the main moving image has 24 frames/sec. The difference in frame rates causes such a phenomenon that two images are seen overlapped with each other in one frame.

When two images thus overlap with each other as described above, an image of a preceding scene and an image of a succeeding scene are seen overlapped with each other in one frame at a cut point. This results in increasing similarity between the preceding and the succeeding frames at the cut point to hinder the above-described cut point detection in some cases. Therefore, thinning out images to eliminate overlap of images enables cut point detection to be conducted more satisfactorily.

Figure 20:
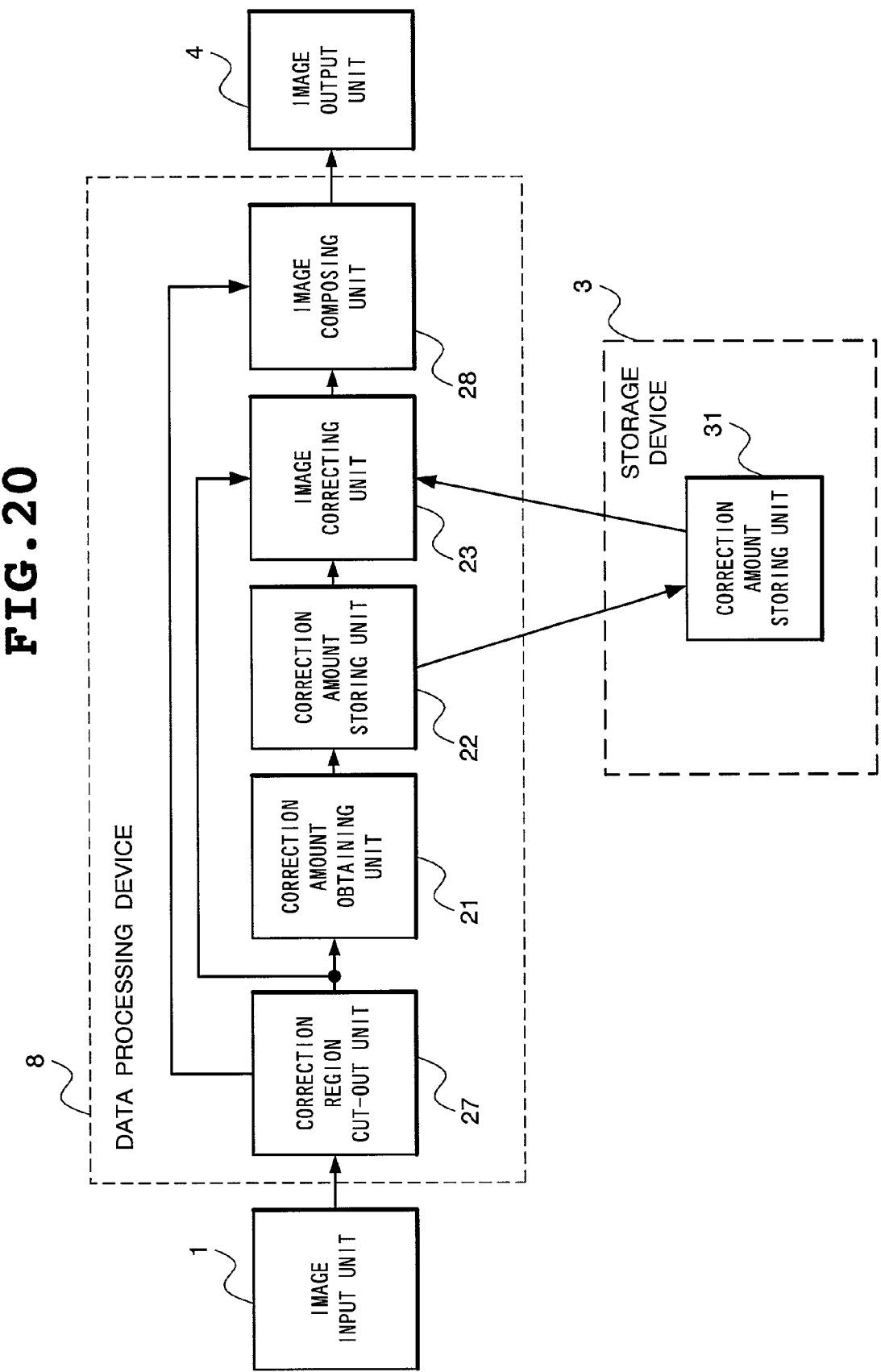
FIG. 20 is a block diagram showing a structure of a video processing device according to a fourth embodiment of the present invention.

FIG. 20 is a block diagram showing a structure of a video processing device according to a fourth embodiment of the present invention. In FIG. 20, the video processing device according to the fourth embodiment of the present invention has the same structure as that of the first embodiment of the present invention shown in FIG. 1 with the only difference being that the data processing device 8 is provided with a correction region cut-out unit 27 and an image composing unit 28, in which the same components are indicated by the same reference numerals. Operation of the counterpart components is the same as that of the first embodiment of the present invention.

Figure 21:
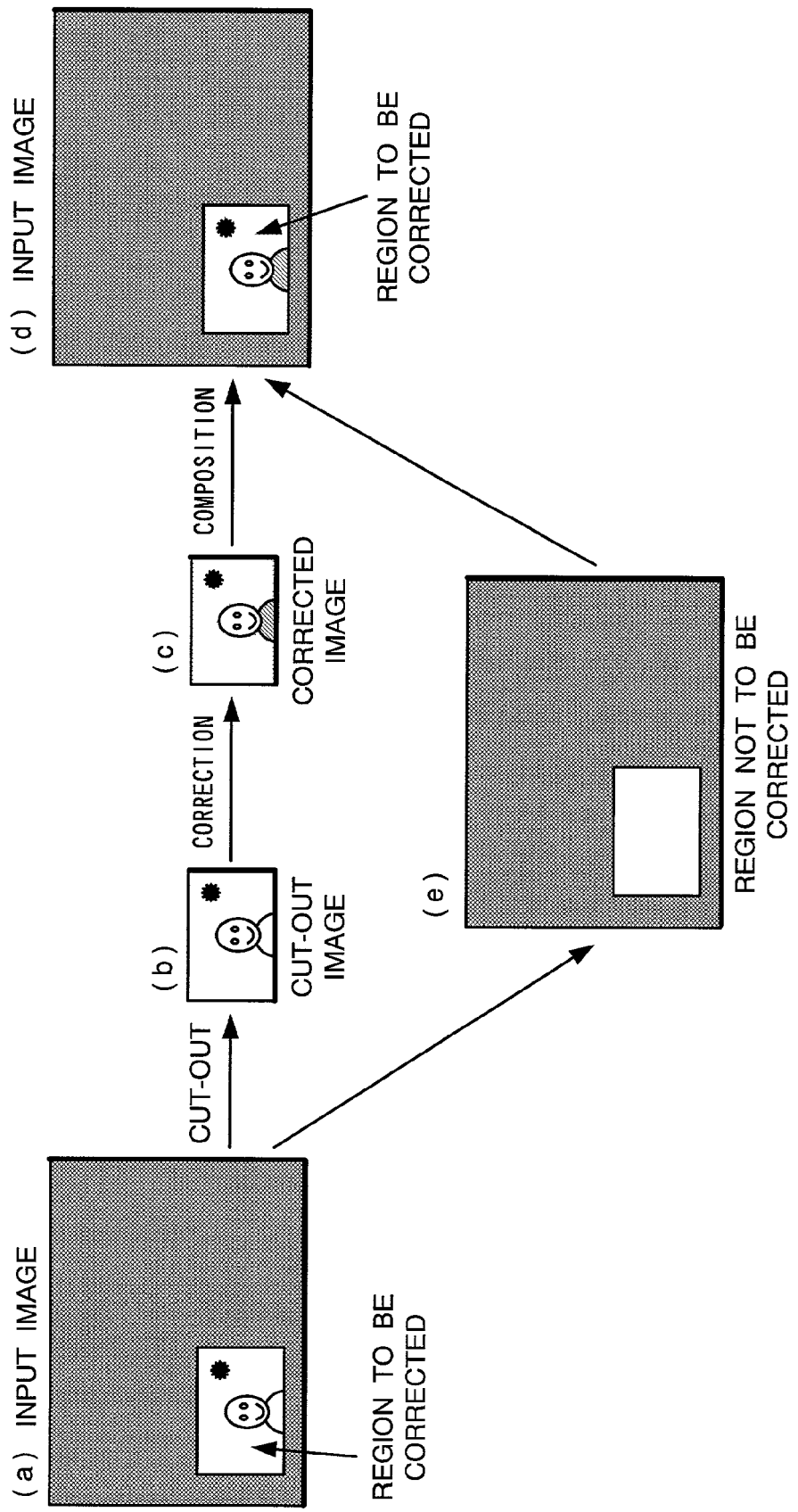
FIG. 21 is a schematic diagram showing processing of the video processing device according to the fourth embodiment of the present invention.

FIG. 21 is a schematic diagram showing processing of the video processing device according to the fourth embodiment of the present invention. With reference to FIG. 21, the correction region cut-out unit 27 and the image composing unit 28 will be described.

The correction region cut-out unit 27, as illustrated in FIG. 21(*a*), cuts out a region to be corrected from an image in which a moving image partly flows into such a cut-out image as shown in FIG. 21(*b*) and such an image of a region not to be corrected as shown in FIG. 21(*e*). The cut-out image shown in FIG. 21(*b*) will have its quality improved as illustrated in FIG. 21(*c*) by the quality improving technique described in the first embodiment of the present invention.

The image composing unit 28 combines the image of a region not to be corrected which is cut out by the correction region cut-out unit 27 and the image being corrected to generate such an input image as shown in FIG. 21(*d*). Here, the generated image is output from the image output unit 4 to end the processing.

Figure 22:
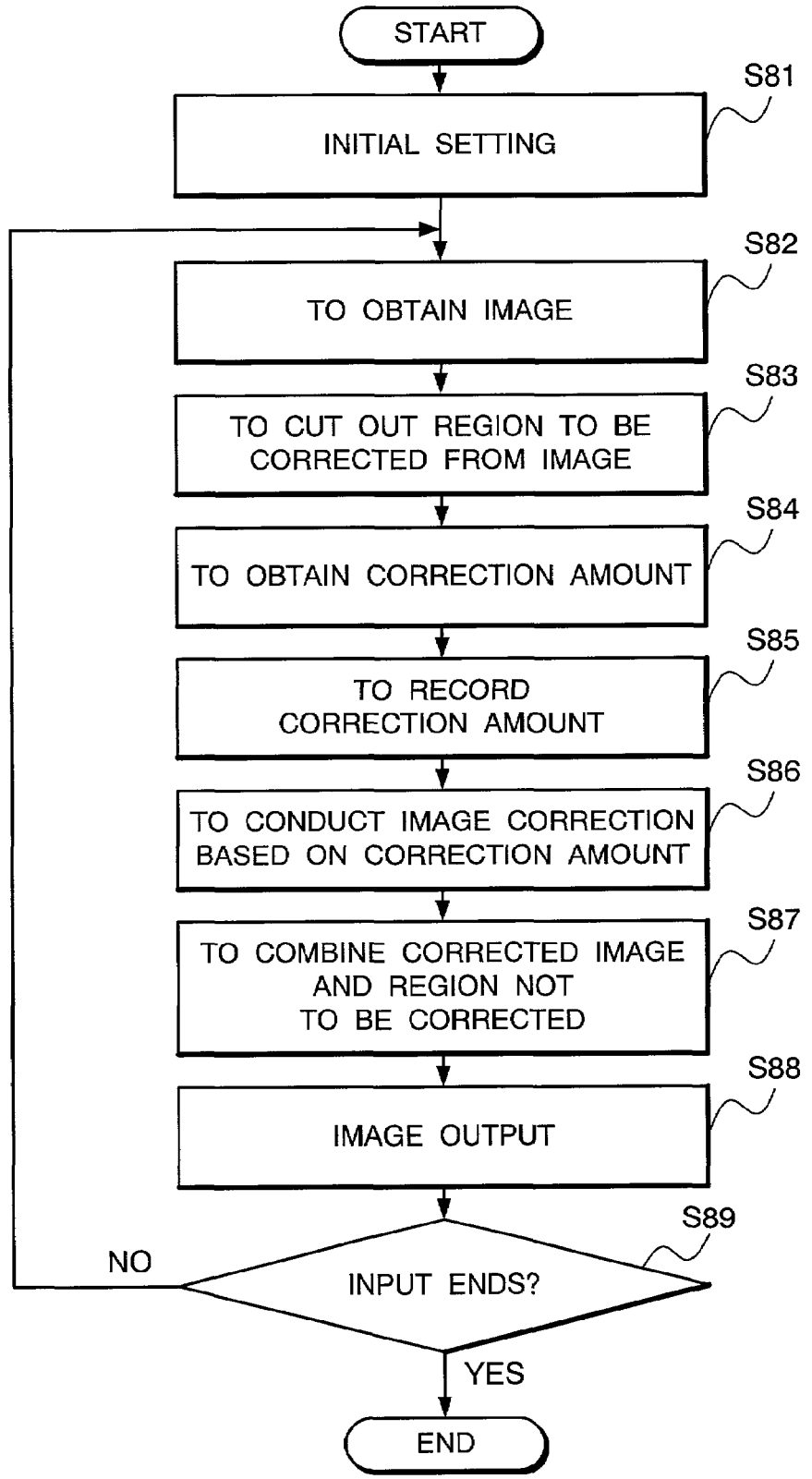
FIG. 22 is a flow chart showing operation of the video processing device according to the fourth embodiment of the present invention.

FIG. 22 is a flow chart showing operation of the video processing device according to the fourth embodiment of the present invention. With reference to FIGS. 20 to 22, operation of the video processing device according to the fourth embodiment of the present invention will be described. Since processing operation at Steps S81, S82, S84 to 86, S88 and S89 is the same as that of the processing operation at Steps S1 to S7 of FIG. 5, no description will be made thereof.

In the first embodiment of the present invention, the whole of an input image is corrected as a region to be corrected. On the other hand, in the present embodiment, first cut out a region where a moving image is displayed from an input image (Step S83 in FIG. 22).

In the present embodiment, obtain a correction amount for the cut out image (Step S84 in FIG. 22) to subject only the cut out image to correction processing based on the obtained correction amount (Step S86 in FIG. 22). The corrected image is combined with a region not to be corrected which is an image left after the region to be corrected is cut out (Step S87 in FIG. 22) to form the same screen as that of the original image. In the present embodiment, the present processing will be repeated until no further image is input.

Because at the time of executing quality improving correction processing, the correction region cut-out unit 27 is allowed to cut out a moving image region from an input image and also because the image composing unit 28 is provided to restore a cut-out moving image which is further subjected to quality improving correction to such arrangement as shown in an original computer screen, the present invention enables quality improving and display of only a moving image region of an image in which a moving image partly flows such as a computer screen.

Upon activation of such an application for displaying a moving image as a media player on a computer screen, an image appears in which still picture forms a surrounding area and a moving image flows locally. With respect to such an image, the correction region cut-out unit 27 cuts the image into a region of still picture and a region of a moving image. As a result, quality improve correction can be conducted with respect to the moving image region using an appropriate correction amount. Thus, the corrected moving image is combined with the still picture region at the surroundings by the image composing unit 28 to obtain a moving image whose quality is improved by a correction amount appropriate for a moving image, while maintaining such display as that on an original computer screen.

Figure 23:
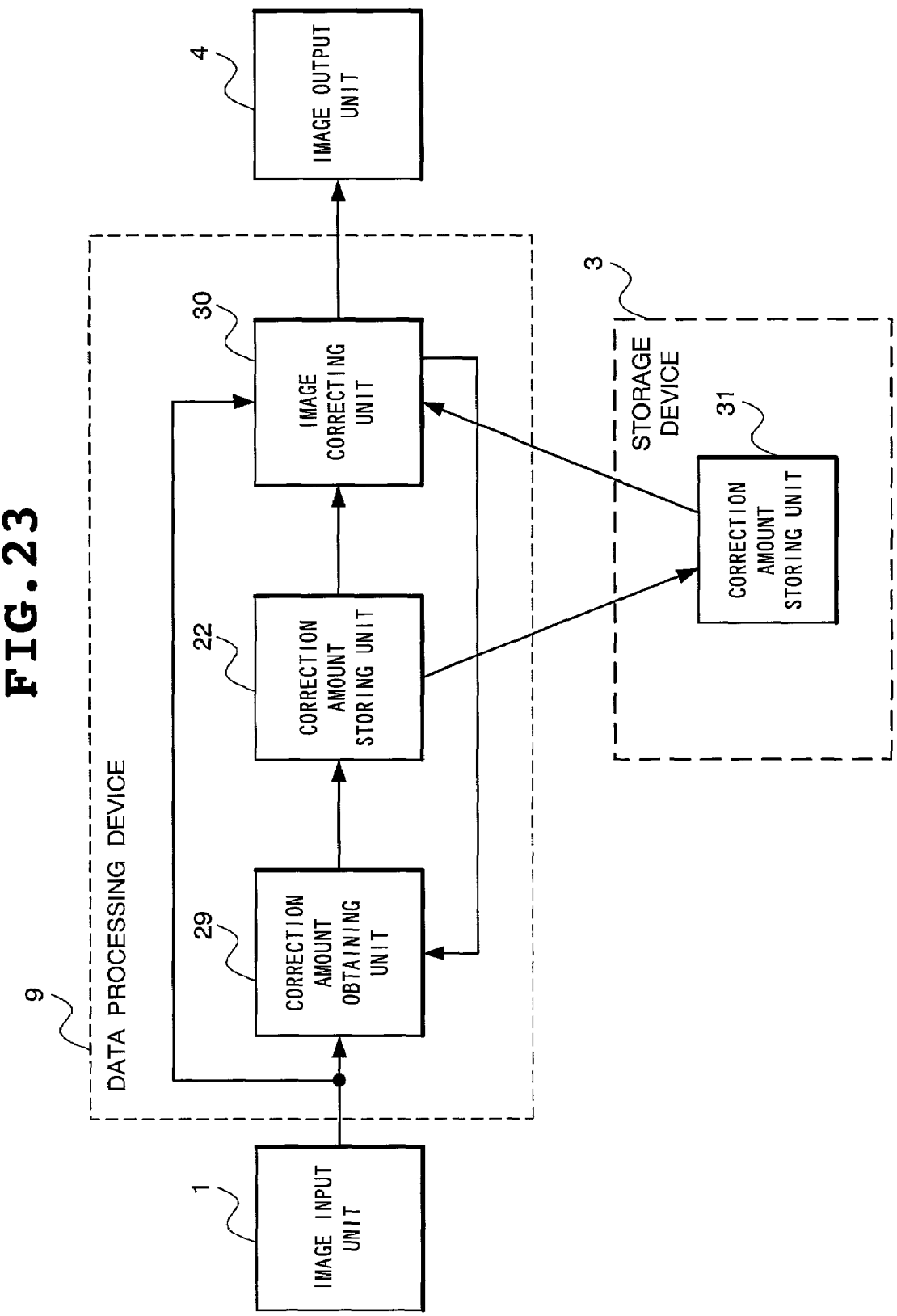
FIG. 23 is a block diagram showing a structure of a video processing device according to a fifth embodiment of the present invention.

FIG. 23 is a block diagram showing a structure of a video processing device according to a fifth embodiment of the present invention. In FIG. 23, the video processing device according to the fifth embodiment of the present invention has the same structure as that of the first embodiment of the present invention shown in FIG. 1 with the only difference being that in the data processing device 9, an image corrected by an image correcting unit 30 is returned to a correction amount obtaining unit 29, in which the same components are indicated by the same reference numerals. In addition, operation of the counterpart components is the same as that of the first embodiment of the present invention.

Figure 24:
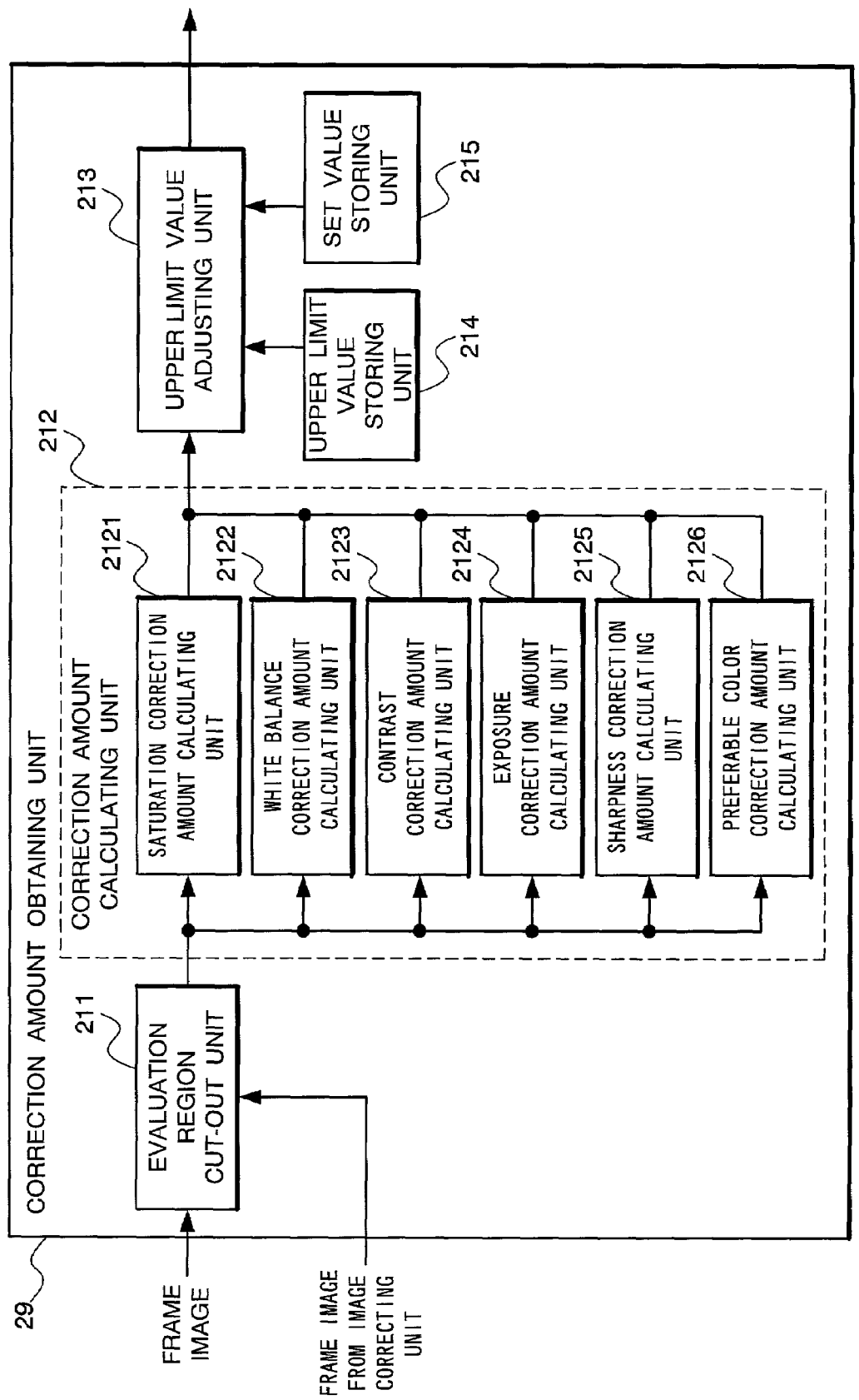
FIG. 24 is a block diagram showing a detailed structure of a correction amount obtaining unit illustrated in FIG. 23.

FIG. 24 is a block diagram showing a detailed structure of the correction amount obtaining unit 29 illustrated in FIG. 23. In FIG. 24, the correction amount obtaining unit 29 has the same structure as that of the correction amount obtaining unit 21 shown in FIG. 2 with the only difference being that it is designed to input an image corrected by the image correcting unit 30 to the evaluation region cut-out unit 211, in which the same components are indicated by the same reference numerals. In addition, operation of the counterpart components is the same as that of the correction amount obtaining unit 21.

Figure 25:
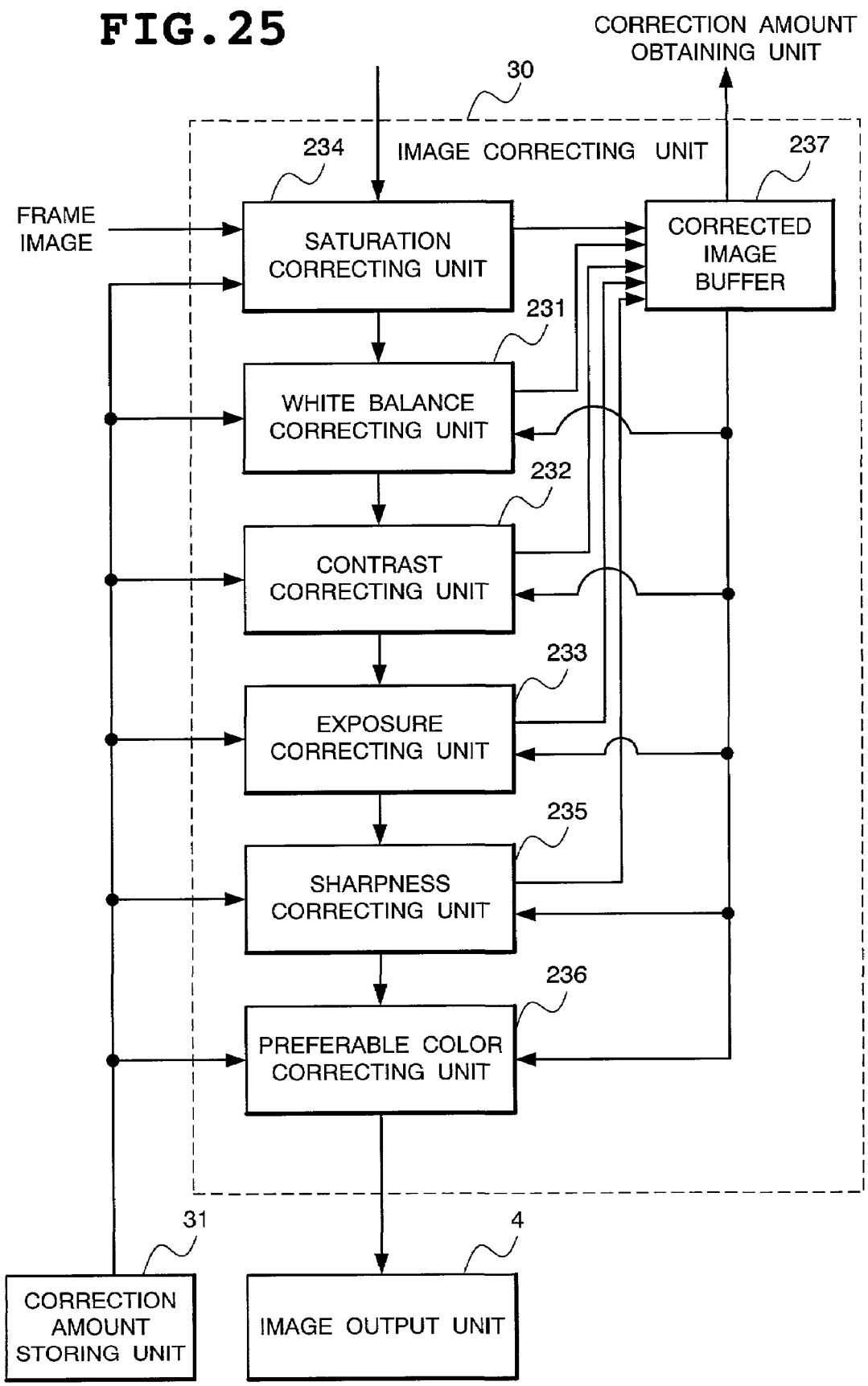
FIG. 25 is a block diagram showing an example of a detailed structure of an image correcting unit illustrated in FIG. 23.

FIG. 25 is a block diagram showing an example of a detailed structure of the image correcting unit 30 illustrated in FIG. 23. In FIG. 25, the image correcting unit 30 has the same structure as that of the image correcting unit 23 shown in FIG. 4 with the only difference being that a corrected image buffer 237 is provided, in which the same components are indicated by the same reference numerals. In addition, operation of the counterpart components is the same as that of the image correcting unit 23.

With reference to FIGS. 23 to 25, description will be made of characteristic operation of the video processing device according to the fifth embodiment of the present invention. Being structured to return an image corrected by the image correcting unit 30 to the correction amount obtaining unit 29, the video processing device according to the fifth embodiment of the present invention corrects an image by each correction unit of the image correcting unit 30 based on a correction amount obtained by each calculation unit of the correction amount obtaining unit 29 and obtains a correction amount from the corrected image by each calculation unit of the correction amount obtaining unit 29.

More specifically, first, the saturation correcting unit 234 corrects an input image based on a correction amount obtained by the saturation correction amount calculating unit 2121 and temporarily accumulates the corrected image in the corrected image buffer 237, as well as returning the corrected image to the correction amount obtaining unit 29.

Subsequently, the white balance correction amount calculating unit 2122 obtains a correction amount from the corrected image obtained by the saturation correcting unit 234. The white balance correcting unit 231 corrects the corrected image which is obtained by the saturation correcting unit 234 and temporarily accumulated at the corrected image buffer 237 based on the correction amount obtained by the white balance correction amount calculating unit 2122 to temporarily accumulate the corrected image at the corrected image buffer 237, as well as returning the corrected image to the correction amount obtaining unit 29.

In the same manner as described above, the contrast correction amount calculating unit 2123 obtains a correction amount from the corrected image obtained by the white balance correcting unit 231. The contrast correcting unit 232 corrects the corrected image which is obtained by the white balance correcting unit 231 and temporarily accumulated at the corrected image buffer 237 based on the correction amount obtained by the contrast correction amount calculating unit 2123 to temporarily accumulate the obtained corrected image in the corrected image buffer 237, as well as returning the corrected image to the correction amount obtaining unit 29.

The exposure correction amount calculating unit 2124 obtains a correction amount from the corrected image obtained by the contrast correcting unit 232. The exposure correcting unit 233 corrects the corrected image which is obtained by the contrast correcting unit 232 and temporarily accumulated at the corrected image buffer 237 based on the correction amount obtained by the exposure correction amount calculating unit 2124 to temporarily accumulate the obtained corrected image in the corrected image buffer 237, as well as returning the corrected image to the correction amount obtaining unit 29.

The sharpness correction amount calculating unit 2125 obtains a correction amount from the corrected image obtained by the exposure correcting unit 233. The sharpness correcting unit 235 corrects the corrected image which is obtained by the exposure correcting unit 233 and temporarily accumulated at the corrected image buffer 237 based on the correction amount obtained by the sharpness correction amount calculating unit 2125 to temporarily accumulate the obtained corrected image at the corrected image buffer 237, as well as returning the corrected image to the correction amount obtaining unit 29.

The preferable color correction amount calculating unit 2126 obtains a correction amount from the corrected image obtained by the sharpness correcting unit 235. The preferable color correcting unit 236 corrects the corrected image which is obtained by the sharpness correcting unit 235 and temporarily accumulated at the corrected image buffer 237 based on the correction amount obtained by the preferable color correction amount calculating unit 2126 to temporarily accumulate the obtained corrected image at the corrected image buffer 237, as well as returning the corrected image to the correction amount obtaining unit 29.

By thus conducting correction by each correction unit of the image correcting unit 30 based on a correction amount obtained by each calculation unit of the correction amount obtaining unit 29 and obtaining a correction amount from the corrected image by means of each calculation unit of the correction amount obtaining unit 29, an input image can be appropriately corrected. The order of arrangement of the above-described correction amount calculating units and the correcting units is not limited to those shown in FIGS. 24 and 25. Any one or more of the correction amount calculating units and the correcting units can be omitted or other unit may be added. In this case, deletion and addition of the above-described units are executed in a pair of the correction amount calculating unit and the correcting unit.

Figure 26:
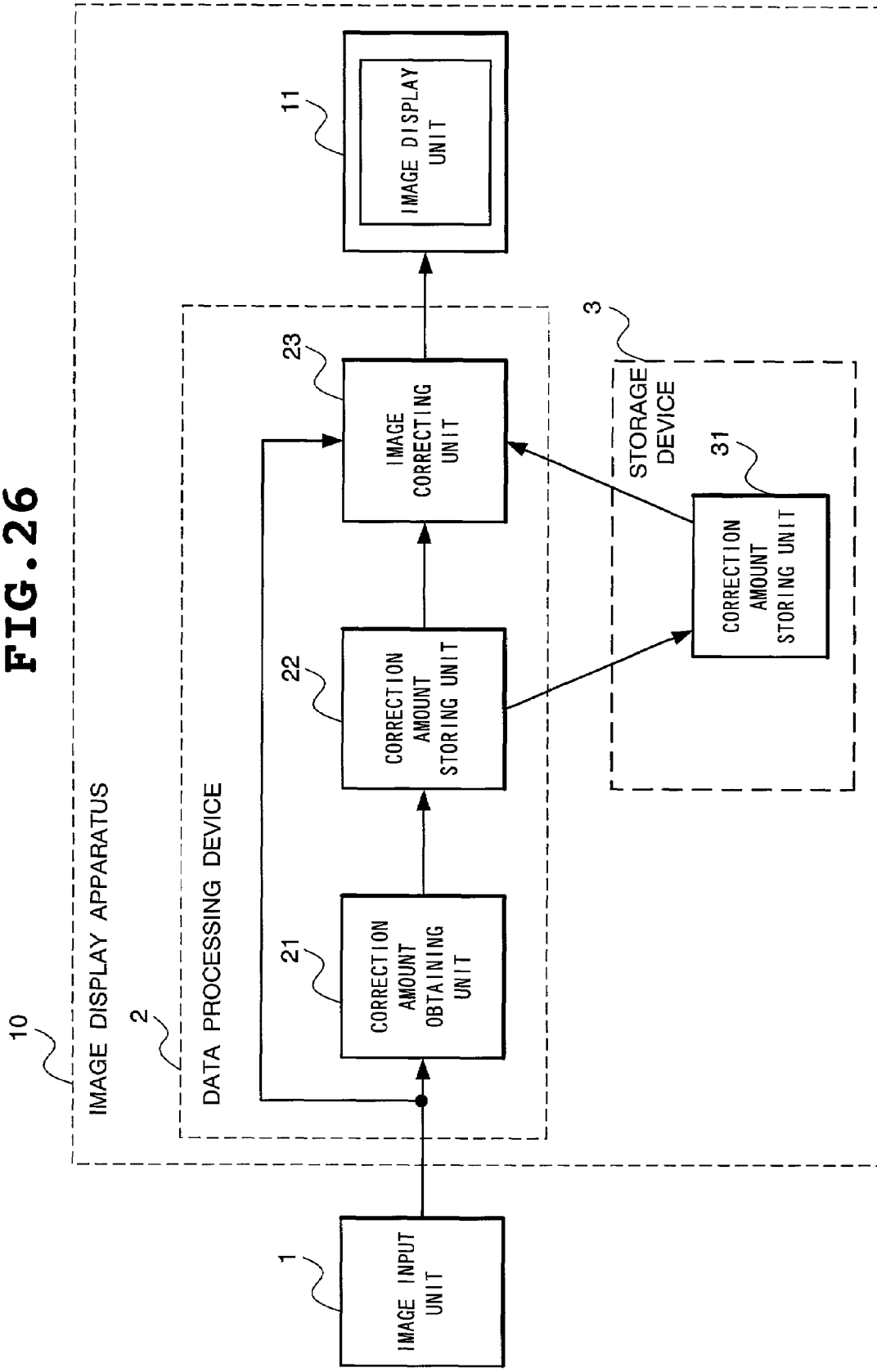
FIG. 26 is a block diagram showing a structure of a video display device according to a sixth embodiment of the present invention.

FIG. 26 is a block diagram showing a structure of a video display device according to a sixth embodiment of the present invention. In FIG. 26, the video display device according to the sixth embodiment of the present invention is a device using the above-described video processing device and composed of an image input unit 1 and an image display apparatus 10.

The image input unit 1 is the same as that of the first embodiment of the present invention. The image display apparatus 10 includes a data processing device 2, a storage device 3 and an image display unit (monitor) 11. Here, the data processing device 2 and the storage device 3 are the same as those of the first embodiment of the present invention. The image display unit 11 is a CRT (cathode-ray tube) monitor, a liquid crystal monitor or the like.

When moving image data is applied through the image input unit 1, similarly to the processing by the first embodiment of the present invention, the data processing device 2 and the storage device 3 conduct such correction as white balance correction, contrast correction, exposure correction, saturation correction, sharpness correction and the like with respect to the moving image to improve the quality of the image. Here, as to correction given to an image, not all the five kinds of corrections described here needs to be conducted and other correction than the corrections mentioned above, and such quality improve correction as preferable color correction may be added. Image subjected to this correction to have its quality improved is displayed on the image display unit 11.

Figure 27:
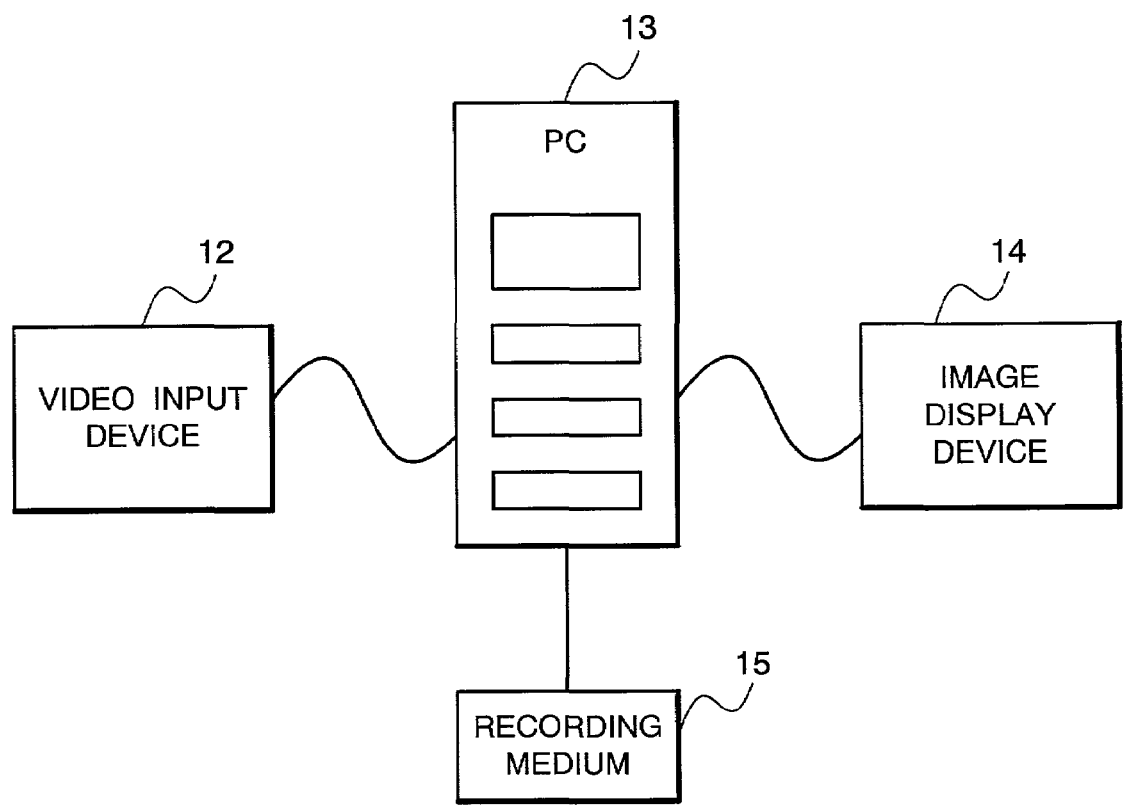
FIG. 27 is a block diagram showing a structure of a video processing device according to a seventh embodiment of the present invention.
Figure 30:
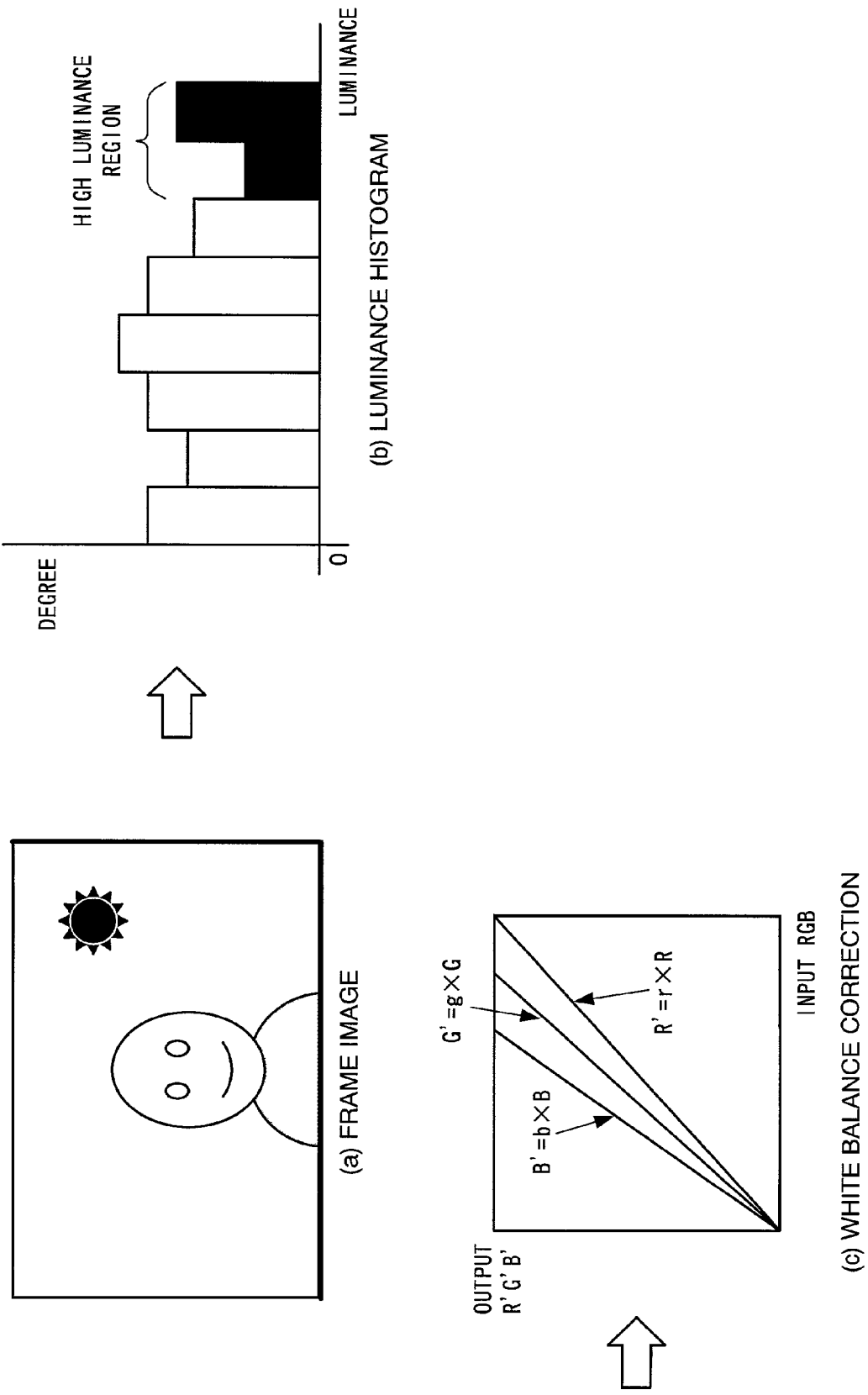
FIG. 30 is a diagram for use in explaining one example of conventional white balance automatic improving correction.
Figure 34:
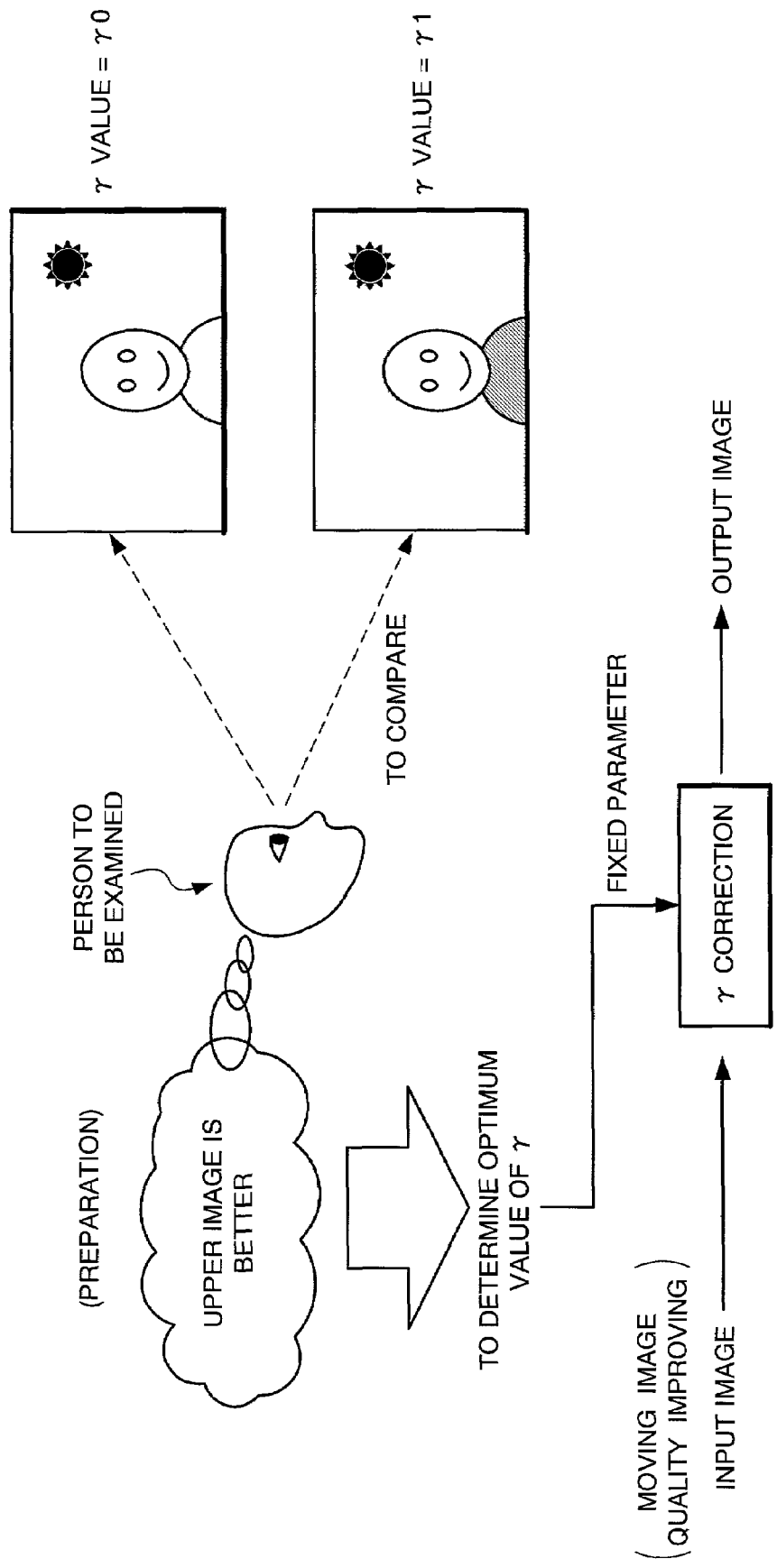
FIG. 34 is a diagram for use in explaining one example of a conventional quality improving technique using a fixed parameter.

FIG. 27 is a block diagram showing a structure of a video processing device according to a seventh embodiment of the present invention. In FIG. 27, the video processing device according to the seventh embodiment of the present invention includes a recording medium 15 which records a program of the above-described video processing method.

More specifically, the video processing device according to the seventh embodiment of the present invention includes a video input device 12 for receiving input of a moving image, a personal computer (hereinafter referred to as PC) 13 for processing a program, an image display device 14 for displaying a processing result and the recording medium 15 storing the program which is executed by the PC 13 and realizes the above-described video processing method.

When a moving image is applied to the PC 13 through the video input device 12, the PC 13 executes correction with respect to the moving image based on the program of the video processing method for automatically improving quality of a moving image which is recorded in the recording medium 15. The corrected moving image is sent to the image display device 14 and displayed thereon.

As described in the foregoing, according to the present invention, at the time of improving quality of sequentially applied video, by obtaining a correction amount from each frame image forming the input moving image in order to conduct quality improve correction of the input moving image and by subjecting the frame image to quality improve correction based on the obtained correction amount, a correction amount can be changed appropriately according to quality of an input moving image to automatically improve quality of the moving image.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A video processing device comprising:
   correction amount obtaining means for obtaining a correction amount from sequentially applied moving images,
   image correcting means for subjecting an input moving image to quality improving correction processing based on a correction amount obtained by said correction amount obtaining means,
   image input means for obtaining a frame image from sequentially applied moving images and outputting the image to said correction amount obtaining means, wherein said correction amount obtaining means obtains said correction amount from said frame image and said image correcting means subjects said frame image to quality improving correction processing based on said correction amount,
   lapse of fixed time detecting means for counting the number of frames from a frame image whose said correction amount is lastly updated to a current frame image to determine whether the number of frames exceeds a fixed value, and
   correction amount update determining means for giving an instruction to update said correction amount when said lapse of fixed time detecting means determines that a fixed time has elapsed.

2. A video processing device comprising:
   correction amount obtaining means for obtaining a correction amount from sequentially applied moving images,
   image correcting means for subjecting an input moving image to quality improving correction processing based on a correction amount obtained by said correction amount obtaining means,
   image input means for obtaining a frame image from sequentially applied moving images and outputting the image to said correction amount obtaining means, wherein said correction amount obtaining means obtains said correction amount from said frame image and said image correcting means subjects said frame image to quality improving correction processing based on said correction amount,
   lapse of fixed time detecting means for counting the number of frames from a frame image whose said correction amount is lastly updated to a current frame image to determine whether the number of frames exceeds a fixed value,
   cut point detecting means for detecting a cut point indicative of switching of a scene in said moving image based on a change of a feature amount obtained from each frame image, and
   correction amount update determining means for giving an instruction to update said correction amount either when detection of a lapse of a fixed time is made by said lapse of fixed time detecting means or when detection of said cut point is made by said cut point detecting means.

3. A video processing device comprising:
   correction amount obtaining means for obtaining a correction amount from sequentially applied moving images,
   image correcting means for subjecting an input moving image to quality improving correction processing based on a correction amount obtained by said correction amount obtaining means,
   image input means for obtaining a frame image from sequentially applied moving images and outputting the image to said correction amount obtaining means, wherein said correction amount obtaining means obtains said correction amount from said frame image and said image correcting means subjects said frame image to quality improving correction processing based on said correction amount, and
   cut point detecting means for detecting a cut point indicative of switching of a scene in said moving image based on a change of a feature amount obtained from each frame image, and correction amount update determining means for giving an instruction to update said correction amount when said cut point detecting means detects said cut point,
   wherein said cut point detecting means is structured to consider a result of comparison of a color histogram generated based on color information of each pixel of said moving image which is conducted on a frame basis as a feature amount and detect a cut point of said moving image based on a change of the feature amount and wherein said cut point detecting means is structured to, at the time of generating said color histogram from said moving image, generate said color histogram after thinning out the image at fixed intervals.

4. A video processing device comprising:

image input means for obtaining a frame image from sequentially applied moving images, and cut point detecting means for detecting a cut point indicative of switching of a scene in said moving image based on a change of a feature amount obtained from each frame image, wherein said cut point detecting means is structured to consider a result of comparison of a color histogram generated based on color information of each pixel of said moving image which is conducted on a frame basis as a feature amount and detect a cut point of said moving image based on a change of the feature amount, and wherein said cut point detecting means is structured to, at the time of generating said color histogram from said moving image, generate said color histogram after thinning out the image at fixed intervals.

5. A video processing method comprising the steps of:

obtaining a correction amount from sequentially applied moving images, conducting quality improving correction with respect to said applied moving image based on the obtained correction amount, and checking said input moving image on a frame basis and when a cut point indicative of switching of a scene in said input moving image is detected, updating a correction amount at the detection of said cut point considering a result of comparison of a color histogram generated based on color information of each pixel of said moving image which is conducted on a frame basis as a feature amount and detecting a cut point of the moving image based on a change of the feature amount, and when detecting said cut point, at the time of generating said color histogram from said frame image, generating said color histogram after thinning out the image at fixed intervals.

6. A video processing method comprising the steps of:

obtaining a frame image from sequentially applied moving images, and detecting a cut point indicative of switching of a scene in said moving image based on a change of a feature amount obtained from each frame image, wherein at said cut point detecting step, a result of comparison of a color histogram generated based on color information of each pixel of said moving image which is conducted on a frame basis is considered as a feature amount and a cut point of said moving image is detected based on a change of the feature amount, and wherein at said cut point detecting step, at the time of generating said color histogram from said moving image, said color histogram is generated after thinning out the image at fixed intervals.

7. A video processing method comprising the steps of:

a correction amount obtaining step of obtaining a correction amount from sequentially applied moving images, an image correcting step of subjecting an input moving image to quality improving correction processing based on a correction amount obtained by said correction amount obtaining step, an image input step of obtaining said a frame image from sequentially applied moving images and outputting the image to said correction amount obtaining step, wherein said correction amount obtaining step obtains said correction amount from said frame image and said image correcting step subjects said frame image to quality improving correction processing based on said correction amount, lapse of fixed time detecting step of counting the number of frames from a frame image whose said correction amount is lastly updated to a current frame image to determine whether the number of frames exceeds a fixed value, and correction amount update determining step of giving an instruction to update said correction amount when said lapse of fixed time detecting step determines that a fixed time has elapsed.

8. A video processing method comprising the steps of:

correction amount obtaining step of obtaining a correction amount from sequentially applied moving images, image correcting step of subjecting an input moving image to quality improving correction processing based on a correction amount obtained by said correction amount obtaining step, image input step of obtaining a frame image from sequentially applied moving images and outputting the image to said correction amount obtaining step, wherein said correction amount obtaining step obtains said correction amount from said frame image and said image correcting step subjects said frame image to quality improving correction processing based on said correction amount, lapse of fixed time detecting step of counting the number of frames from a frame image whose said correction amount is lastly updated to a current frame image to determine whether the number of frames exceeds a fixed value, cut point detecting step of detecting a cut point indicative of switching of a scene in said moving image based on a change of a feature amount obtained from each frame image, and correction amount update determining step of giving an instruction to update said correction amount either when detection of a lapse of a fixed time is made by said lapse of fixed time detecting step or when detection of said cut point is made by said cut point detecting step.

* * * * *